(12) United States Patent
Mou et al.

(10) Patent No.: US 11,668,293 B2
(45) Date of Patent: Jun. 6, 2023

(54) MICRO PUMP HAVING NOISE-REDUCED PRESSURE-RELEASING STRUCTURE

(71) Applicant: MICROJET TECHNOLOGY CO., LTD., Hsinchu (TW)

(72) Inventors: Hao-Jan Mou, Hsinchu (TW); Chung-Wei Kao, Hsinchu (TW); Shih-Chang Chen, Hsinchu (TW); Chi-Chang Yang, Hsinchu (TW); Yung-Lung Han, Hsinchu (TW); Chi-Feng Huang, Hsinchu (TW); Chun-Yi Kuo, Hsinchu (TW); Yang Ku, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 155 days.

(21) Appl. No.: 17/142,342

(22) Filed: Jan. 6, 2021

(65) Prior Publication Data

US 2021/0215150 A1 Jul. 15, 2021

(30) Foreign Application Priority Data

Jan. 13, 2020 (TW) .................................. 109101114

(51) Int. Cl.
*F04B 43/04* (2006.01)
*F04B 53/00* (2006.01)
*F16K 99/00* (2006.01)

(52) U.S. Cl.
CPC .......... *F04B 43/046* (2013.01); *F04B 53/001* (2013.01); *F16K 99/0015* (2013.01); *F16K 2099/0094* (2013.01)

(58) Field of Classification Search
CPC .... F04B 43/046; F04B 45/047; F04B 17/003; F04B 53/10; F04B 53/106; F16K 99/0015; B05B 1/002
See application file for complete search history.

(56) References Cited

U.S. PATENT DOCUMENTS 9,545,465 B2 1/2017 Allen et al.
10,047,870 B2 8/2018 Wu et al.
(Continued)

FOREIGN PATENT DOCUMENTS

CN 104470551 A 3/2015
CN 107631062 A 1/2018
(Continued)

OTHER PUBLICATIONS

Hirata, Cooling Device and Electronic Equipment, 'JP2009250132A_MT.pdf', (Oct. 2009) (Year: 2009).*

*Primary Examiner* — Kenneth J Hansen
(74) *Attorney, Agent, or Firm* — McClure, Qualey & Rodack, LLP

(57) ABSTRACT

A micro pump having noise-reduced pressure-releasing structure includes a convergence plate, a valve sheet, a chamber plate, and a micro pump. The convergence plate has a convergence outlet and a discharge outlet. The valve sheet has a valve hole and a discharge recessed portion. The chamber plate has a recessed hole, a fluid determine hole, fluid through holes, and a receiving trough. The micro pump is in the receiving trough. During operation of the micro pump, the fluid is firstly transmitted to the fluid through hole and the fluid determine hole to push the valve sheet, and the fluid determine hole pushes the discharge recessed portion to block the discharge outlet. Then, since the pressure of the fluid at the fluid through hole pushes the valve sheet, the fluid flows through the valve hole so as to be discharged out from the convergence outlet.

17 Claims, 21 Drawing Sheets

(56) References Cited

U.S. PATENT DOCUMENTS

2018/0128262 A1\* 5/2018 Mou .................. F16K 99/0015
2020/0217426 A1 7/2020 Kawamura

FOREIGN PATENT DOCUMENTS

| CN | 109424521 A | 3/2019 |
| CN | 208686556 U | 4/2019 |
| CN | 110546415 A | 12/2019 |
| JP | 2009250132 A | 10/2009 |
| TW | M570889 U | 1/2020 |

\* cited by examiner

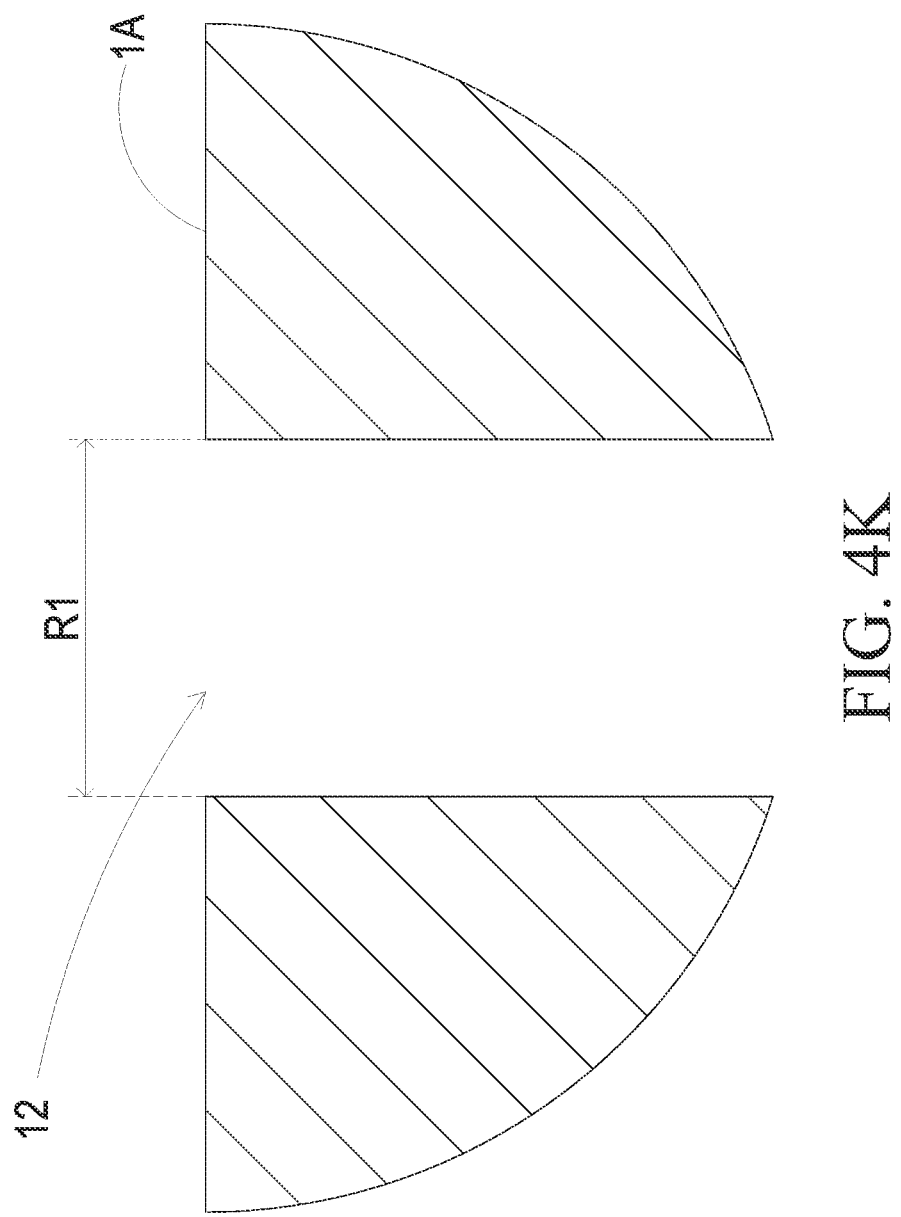

MICRO PUMP HAVING NOISE-REDUCED PRESSURE-RELEASING STRUCTURE

CROSS-REFERENCE TO RELATED APPLICATION

This non-provisional application claims priority under 35 U.S.C. § 119(a) to Patent Application No. 109101114 in Taiwan, R.O.C. on Jan. 13, 2020, the entire contents of which are hereby incorporated by reference.

BACKGROUND

Technical Field

The present disclosure relates to a micro pump having noise-reduced pressure-releasing structure, in particular, to a micro pump having noise-reduced pressure-releasing structure which is miniaturized, quiet, and capable of transmitting a large amount of fluids.

Related Art

In daily lives, the purpose of fluid transmission for many equipment or apparatuses driven by fluids is usually achieved by conventional motors and fluid valves. However, it is understood that, the conventional motors and fluid valves may generate noises during operations, thereby leading the inconvenience and the discomfort. Especially, the conventional motors and fluid valves prone to generate noises during the pressure-releasing procedure.

Therefore, it is an important issue now to develop a micro pump capable of improving the foregoing disadvantage(s) so as to allow the conventional equipment or apparatuses using the fluid transmission device can reduce in size, be miniaturized, be quiet, transmit a large amount of fluids, and reduce undesired noises during the pressure-releasing procedure.

SUMMARY

One object of the present disclosure is providing a micro pump having noise-reduced pressure-releasing structure (hereinafter, for sake of convenience and clarity, the micro pump device). With the turbulence feature, the micro pump device can reduce the noise produced upon the fluid flows through the discharge outlet. A convergence plate has a discharge outlet penetrating thereof from a convergence plate first surface of the convergence plate to a convergence plate second surface of the convergence plate. Owing to that the cross-sectional area of the discharge outlet at the convergence plate first surface is different from the cross-sectional area of the discharge outlet at the convergence plate second surface, the turbulence is provided in the passageway of the discharge outlet during the pressure-releasing procedure. Moreover, the noise generated by the micro pump driven by the piezoelectric actuator during fluid transmission is very small. Furthermore, the valve sheet is a movable thin sheet, so that the pressure difference allows the valve hole to passively open or close the flowing path of the valve hole. Moreover, the fluid determine hole of the chamber plate also pushes the discharge recessed portion of the valve upwardly due to the pressure difference, so that the discharge recessed portion blocks the discharge outlet of the convergence plate to allow the fluid to flow in a single direction and to be discharged out from the convergence outlet of the convergence plate. When the micro pump is not in operation, the fluid is firstly flowed back below the convergence outlet of the convergence plate, and the pressure of the fluid pushes the valve sheet below the convergence outlet. Since the valve hole is blocked by the outer peripheral portion of the recessed hole of the chamber plate, the fluid flows toward the discharge channel and downwardly pushes the discharge recessed portion of the valve sheet below the discharge outlet, so that the fluid flows out from the discharge outlet through the discharge channel. Accordingly, the fluid can be controlled by the discharge channel of the convergence plate and the valve sheet so as to be discharged out of the convergence plate rapidly to complete the pressure-releasing procedure. Hence, the micro pump device of one or some embodiments of the present invention can achieve the benefits of size-miniaturized and noise-reduced, the micro pump device is capable of transmitting a large amount of fluids, and reducing unwanted noises during the pressure-releasing procedure.

A general embodiment of the present disclosure provides a micro pump having noise-reduced pressure-releasing structure including a convergence plate, a valve sheet, a chamber plate, and a micro pump. The convergence plate has a convergence plate first surface, a convergence plate second surface, a convergence outlet, and a discharge outlet. The convergence plate second surface and the convergence plate first surface are opposite surfaces. The convergence outlet and the discharge outlet both penetrate the convergence plate from the convergence plate first surface to the convergence plate second surface. The convergence plate second surface further comprises at least one mortise and a discharge channel. The at least one mortise is symmetrically disposed on the convergence plate second surface. The discharge channel is in communication with the convergence outlet, and the discharge channel is in communication with the discharge outlet. The valve sheet has a first contact surface and a second contact surface. The first contact surface and the convergence plate second surface of the convergence plate form a connection surface. The second contact surface and the first contact surface are opposite to each other. The first contact surface includes a valve hole, at least one tenon through hole, and a discharge recessed portion. The valve hole and the at least one tenon through hole both penetrate the valve sheet from the first contact surface to the second contact surface, and the at least one tenon through hole and the at least one mortise are disposed correspondingly. The chamber plate has a chamber plate first surface and a chamber plate second surface. The chamber plate first surface and the second contact surface of the valve sheet form another connection surface. The chamber plate second surface and the chamber plate first surface are opposite to each other. The chamber plate first surface includes a recessed hole, a fluid determine hole, at least one fluid through hole, and at least one tenon. The recessed hole does not penetrate the chamber plate from the chamber plat first surface to the chamber plate second surface. The fluid determine hole and the at least one fluid through hole both penetrate the chamber plate from the chamber plate first surface to the chamber plate second surface. The at least one tenon, the at least one mortise of the convergence plate, and the at least one tenon through hole of the valve sheet are disposed correspondingly. The chamber plate second surface has a receiving trough. The micro pump is positioned in the receiving trough of the chamber plate so as to transmit a fluid to the convergence outlet of the convergence plate through the at least one fluid through hole of the chamber plate and the valve hole of the valve sheet. During operation of the micro pump, firstly the fluid is transmitted to the at least one fluid through hole and the fluid determine hole of the chamber plate to push the valve sheet. Meanwhile, the fluid determine hole of the chamber plate pushes the discharge recessed portion of the valve sheet above the fluid determine hole to block the discharge outlet of the convergence plate. Then, since the pressure of the fluid at the at least one fluid through hole of the chamber plate pushes the valve sheet above the recessed hole of the chamber plate, the fluid is capable of flowing through the valve hole of the valve sheet so as to be discharged out from the convergence outlet of the convergence plate.

BRIEF DESCRIPTION OF THE DRAWINGS

The disclosure will become more fully understood from the detailed description given herein below for illustration only, and thus not limitative of the disclosure, wherein:

FIG. 4K illustrates an enlarged partial view of the discharge outlet in the D portion shown in FIG. 4J;

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Figure 1:
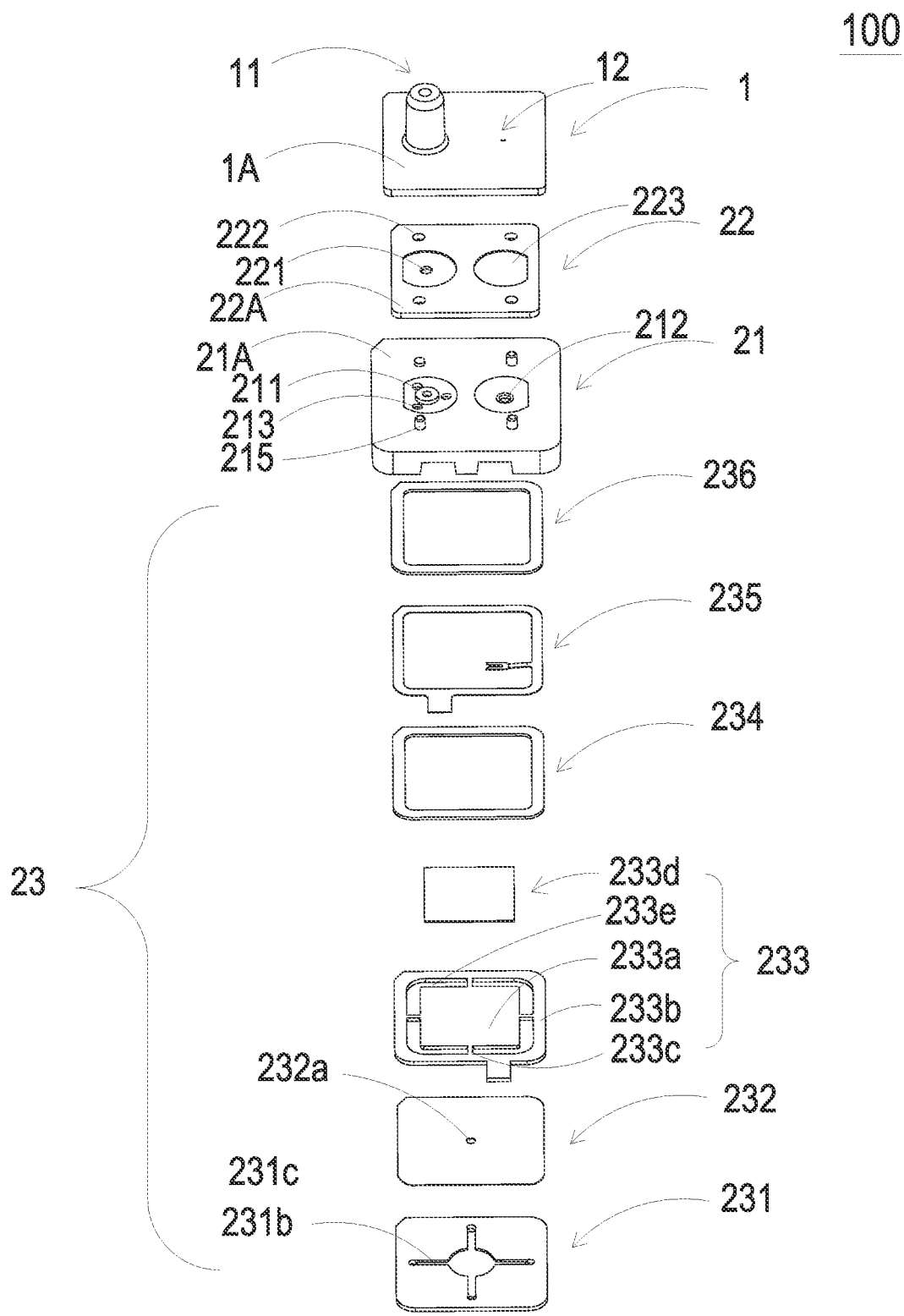
FIG. 1 illustrates an exploded view of a micro pump having noise-reduced pressure-releasing structure according to an exemplary embodiment of the present disclosure.
Figure 2:
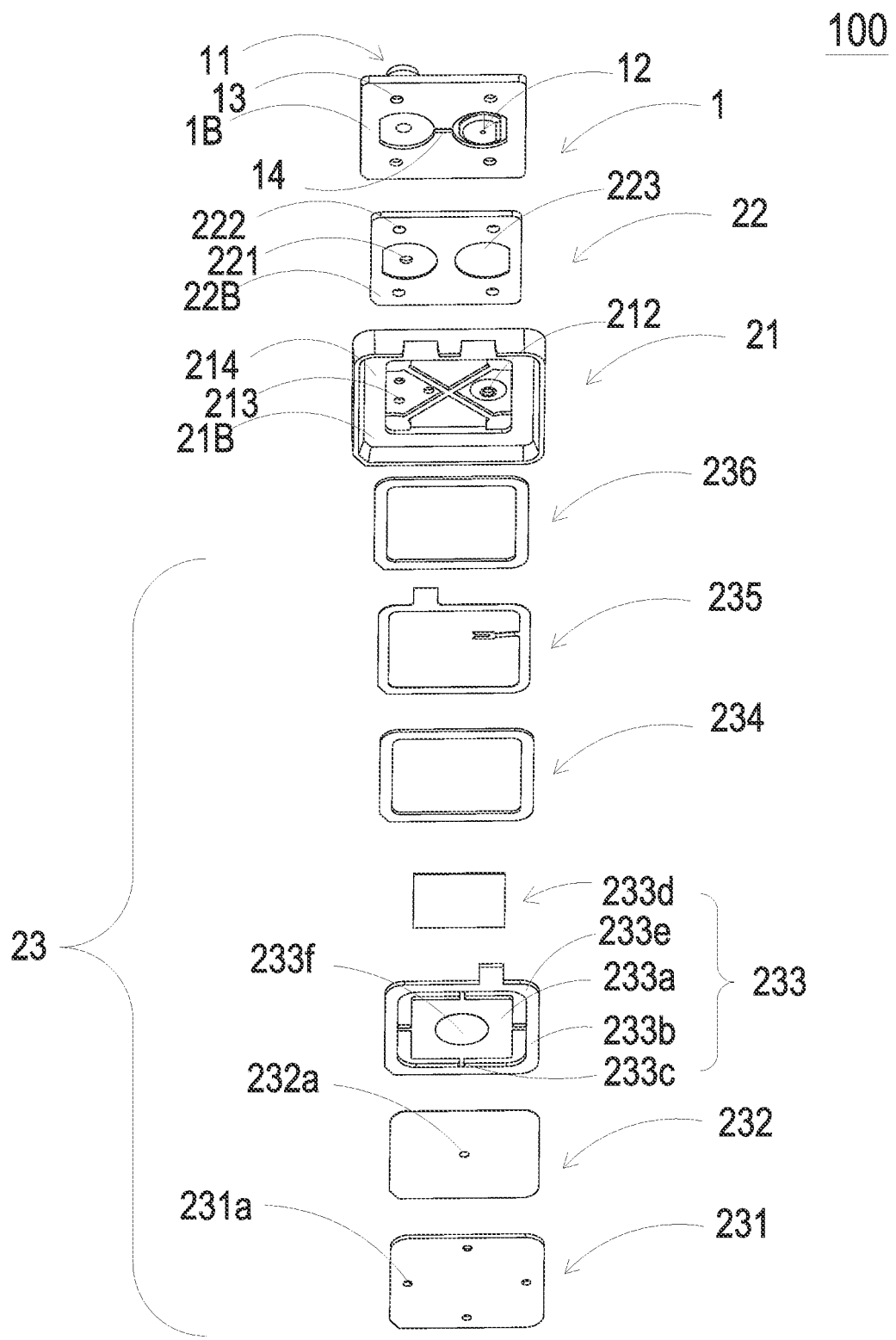
FIG. 2 illustrates an exploded view of the micro pump having noise-reduced pressure-releasing structure of the exemplary embodiment, from another perspective.

Please refer to FIG. 1 and FIG. 2. A micro pump having noise-reduced pressure-releasing structure 100 (hereinafter, for sake of convenience and clarity, the micro pump device 100) is provided and includes a convergence plate 1, a valve sheet 22, a chamber plate 21, and micro pump 23. The micro pump 23 is provided for outputting fluids. The convergence plate 1, the valve sheet 22, and the chamber plate 21 are sequentially assembled and positioned on the micro pump 23 so as to form a device capable of transmitting and outputting fluids.

The convergence plate 1 has a convergence plate first surface 1A, a convergence plate second surface 1B, a convergence outlet 11, and a discharge outlet 12. The convergence plate second surface 1B and the convergence plate first surface 1A are opposite surfaces. The convergence outlet 11 and the discharge outlet 12 both penetrate the convergence plate 1 from the convergence plate first surface 1A to the convergence plate second surface 1B. The convergence plate second surface 1B further includes at least 1 one mortise 13 and a discharge channel 14. The at least one mortise 13 is disposed on the convergence plate second surface 1B symmetrically. It is understood that, in embodiment(s) of the present disclosure, the number of the mortises 13 are four, and the four mortises 13 are disposed at four corners of the convergence plate 1, but this invention is not limited thereto. In other embodiments, the number and the position of the mortises 13 may be adjusted according to design requirements. The discharge channel 14 is in communication with the convergence outlet 11, and the discharge channel 14 is in communication with the discharge outlet 12.

The valve sheet 22 has a first contact surface 22A and a second contact surface 22B. The first contact surface 22A and the convergence plate second surface 1B of the convergence plate 1 form a connection surface, and the second contact surface 22B and the first contact surface 22A are opposite to each other. Moreover, the first contact surface 22A includes a valve hole 221, at least one tenon through hole 222, and a discharge recessed portion 223.

The valve hole 221 and the at least one tenon through hole 222 both penetrate the valve sheet 22 from the first contact surface 22A to the second contact surface 22B, and the at least one tenon through hole 222 and the at least one mortise 13 of the convergence plate 1 are disposed correspondingly. It is understood that, in embodiment(s) of the present disclosure, the number of the tenon through holes 222 are four, and the four tenon through holes 222 are provided at the four corners of the valve sheet 22, but this invention is not limited thereto. In other embodiments, the number and the position of the tenon through holes 222 may be adjusted according to design requirements.

The chamber plate 21 has a chamber plate first surface 21A and a chamber plate second surface 21B. The chamber plate first surface 21A and the second contact surface 22B of the valve sheet 22 form another connection surface. The chamber plate second surface 21B and the chamber plate first surface 21A are opposite to each other. Furthermore, the chamber plate first surface 21A includes a recessed hole 211, a fluid determine hole 212, at least one fluid through hole 213, and at least one tenon 215.

The recessed hole 211 does not penetrate the chamber plate 21 from the chamber plate first surface 21A to the chamber plate second surface 21B. The hole size of the recessed hole 211 and the hole size of the valve hole 221 of the valve sheet 22 are the same, and the outer peripheral portion protruding from the recessed hole 211 can seal a portion of the valve sheet 22 at the outer peripheral portion of the valve hole 221. It is noted that, upon transmitting the fluid to the convergence outlet 11 of the convergence plate 1, owing to the pressure of the fluid, the fluid from the recessed hole 211 pushes the valve sheet 22 upwardly (in a direction toward the convergence outlet 11), so that the fluid can flow through the valve hole 221. Furthermore, it is understood that, upon releasing the pressure of the fluid from the convergence outlet 11 of the convergence plate 1 to the discharge outlet 12, owing to the pressure of the fluid, the fluid from the recessed hole 211 pushes the valve sheet 22 downwardly (in a direction toward the recessed hole 211), and owing to the pressure of the fluid, the outer peripheral portion of the valve hole 221 and the outer peripheral portion protruding from the recessed hole 211 are sealed with each other, so that the fluid cannot flow through the valve hole 221.

The fluid determine hole 212 and the at least one fluid through hole 213 both penetrate the chamber plate 21 from the chamber plate first surface 21A to the chamber plate second surface 21B. It is understood that, upon transmitting the fluid to the convergence outlet 11 of the convergence plate 1, owing to the pressure of the fluid, the fluid from the fluid determine hole 212 pushes the discharge recessed portion 223 of the valve sheet 22 upwardly (in a direction toward the discharge outlet 12), so that the discharge recessed portion 223 blocks the discharge outlet 12. Furthermore, it is understood that, upon transmitting the fluid to the convergence outlet 11 of the convergence plate 1, owing to the pressure of the fluid, the fluid from the fluid determine hole 212 pushes the valve sheet 22 upwardly (in the direction toward the convergence outlet 11), so that the fluid can flow through the valve hole 221.

The at least one tenon 215, the at least one mortise 13 of the convergence plate 1, and the at least one tenon through hole 222 of the valve sheet 22 are disposed correspondingly. It is understood that, in embodiment(s) of the present disclosure, the number of the tenon through holes 222 are four, and the four tenon through holes 222 are disposed at four corners of the valve sheet 22, but this invention is not limited thereto. In other embodiments, the number and the position of the tenon through holes 222 may be adjusted according to design requirements.

The chamber plate second surface 21B has a receiving trough 214. The receiving trough 214 can receive one micro pump 23 and can be closely combined with the micro pump 23. Hence, during operation of the micro pump 23, the fluid does not leak out of the receiving trough 214, but through the fluid through hole 213 of the chamber plate 21 as well as the fluid determine hole 212 of the chamber plate 21.

The micro pump 23 is positioned in the receiving trough 214 of the chamber plate 21 so as to transmit the fluid, so that the fluid is transmitted to the convergence outlet 11 of the convergence plate 1 through the at least one fluid through hole 213 of the chamber plate 21 and the valve hole 221 of the valve sheet 22.

During operation of the micro pump 23, the fluid is firstly transmitted to the fluid through hole 213 and the fluid determine hole 212 of the chamber plate 21 to push the valve sheet 22 owing to the pressure of the fluid. Meanwhile, the fluid from the fluid determine hole 212 of the chamber plate 21 pushes the discharge recessed portion 223 of the valve sheet 22 above the fluid determine hole 212 to block the discharge outlet 12 of the convergence plate 1. Since the pressure of the fluid at the at least one fluid through hole 213 of the chamber plate 21 pushes the valve sheet 22 above the recessed hole 211 of the chamber plate 21, the fluid can flow through the valve hole 221 of the valve sheet 22 so as to be discharged out from the convergence outlet 11 of the convergence plate 1.

When the micro pump 23 is not in operation, the fluid is firstly flowed back below the convergence outlet 11 of the convergence plate 1, and the pressure of the fluid pushes the valve sheet 22 below the convergence outlet 11. Since the valve hole 221 is blocked by the outer peripheral portion of the recessed hole 211 of the chamber plate 21, the fluid flows toward the discharge channel 14 of the convergence plate 1 and downwardly pushes the discharge recessed portion 223 of the valve sheet 22 below the discharge outlet 12 (in a direction toward the fluid determine hole 212 of the chamber plate 21), so that the fluid flows out from the discharge outlet 12 through the discharge channel 14, thereby completing a pressure-releasing procedure.

Please refer to FIG. 1, FIG. 2, and FIG. 3A to FIG. 3E. In embodiment(s) of the present disclosure, the micro pump 23 includes an inlet plate 231. The inlet plate 231 has at least one inlet hole 231a, at least one convergence channel 231b, and a convergence chamber 231c. The inlet hole 231a is configured to guide the outside fluid to flow into the micro pump 23. The inlet hole 231a correspondingly penetrates the inlet plate 231 and is in communication with the convergence channel 231b. The convergence channel 231b is in communication with the convergence chamber 231c. Accordingly, the fluid guided from the inlet hole 231a can be converged at the convergence chamber 231c via the convergence channel 231b. The micro pump 23 further includes a resonance sheet 232 attached to the inlet plate 231, and the resonance sheet 232 has a perforation 232a, a movable portion 232b, and a fixed portion 232c. The perforation 232a is located at a center portion of the resonance sheet 232 and corresponds to the convergence chamber 231c of the inlet plate 231. The movable portion 232b is disposed at a periphery of the perforation 232a. The fixed portion 232c is disposed at an outer periphery of the resonance sheet 232 and attached to the inlet plate 231. The micro pump 23 further includes a piezoelectric actuator 233. The piezoelectric actuator 233 is attached to the resonance sheet 232. A chamber space 237 is formed between the resonance sheet 232 and the piezoelectric actuator 233. Accordingly, when the piezoelectric actuator 233 is driven, the piezoelectric actuator 233 resonates with the movable portion 232b of the resonance sheet 232, and the fluid outside the micro pump 23 is guided into the micro pump through the inlet hole 231a of the inlet plate 231, converged at the convergence chamber 231c via the convergence channel 231b, and flowed through the perforation 232a of the resonance sheet 232, thereby achieving transmission of the fluid.

The micro pump 23 provided for outputting fluids is correspondingly positioned in the receiving trough 214 of the chamber plate 21, so that the micro pump 23 is enclosed and sealed in the chamber plate 21 for fluid transmission. The micro pump 23 is sequentially stacked by an inlet plate 231, a resonance sheet 232, a piezoelectric actuator 233, a first insulation sheet 234, a conductive sheet 235, and a second insulation sheet 236. The inlet plate 231 has at least one inlet hole 231a, at least one convergence channel 231b, and a convergence chamber 231c. The inlet hole 231a is configured to guide the outside fluid to flow into the micro pump 23. The inlet hole 231a correspondingly penetrates the inlet plate 231 and is in communication with the convergence channel 231b. The convergence channel 231b is in communication with the convergence chamber 231c. Accordingly, the fluid guided from the inlet hole 231a can be converged at the convergence chamber 231c via the convergence channel 231b. In embodiment(s) of the present disclosure, the number of the inlet holes 231a and the number of the convergence channels 231b are the same, four respectively, but not limited thereto. It is understood that, the number of the inlet holes 231a and the number of the convergence channels 231b may be adjusted according to design requirements. Accordingly, the four inlet holes 231a respectively penetrate the four convergence channels 231b, and the four convergence channels 231b are converged at the convergence chamber 231c.

In embodiment(s) of the present disclosure, the resonance sheet 232 is attached to the inlet plate 231. The resonance sheet 232 has a perforation 232a, a movable portion 232b, and a fixed portion 230c. The perforation 232a is located at a center portion of the resonance sheet 232 and corresponds to the convergence chamber 231c of the inlet plate 231. The movable portion 232b is disposed at a periphery of the perforation 232a. The fixed portion 232c is disposed at an outer periphery of the resonance sheet 232 and attached to the inlet plate 231. In embodiment(s) of the present disclosure, the piezoelectric actuator 233 is attached to the resonance sheet 232 and includes a suspension plate 233a, an outer frame 233b, at least one supporting element 233c, a piezoelectric element 233d, at least one gap 233e, and a protruding portion 233f The suspension plate 233a is in square shape and is capable of bending and vibrating. It is understood that, the reason why the suspension plate 233a adopts the square shape is that, comparing with a circle suspension plate, the square suspension plate 233a has an advantage of saving electricity. The power consumption of a capacitive load operated under a resonance frequency may increase as the resonance frequency increases, and since the resonance frequency of a square suspension plate 233a is much lower than that of a circular suspension plate, the power consumption of the square suspension plate 233a is relatively low as well. Consequently, the square design of the suspension plate 233a used in one or some embodiments of the present disclosure has the benefit of power saving. The outer frame 233b is disposed around the periphery of the suspension plate 233a. The at least one supporting element 233c is connected between the suspension plate 233a and the outer frame 233b to provide a flexible support for the suspension plate 233a. The piezoelectric element 233d has a side length, which is shorter than or equal to a side length of the suspension plate 233a. The piezoelectric element 233d is attached to a surface of the suspension plate 233a so as to drive the suspension plate 233a to bend and vibrate when the piezoelectric element 233d is applied with a voltage. The at least one gap 233e is formed between the suspension plate 233a, the outer frame 233b, and the at least one connecting element 233c, and the at least one gap 233e is provided for the fluid to flow therethrough. The protruding portion 233f is disposed on a surface of the suspension plate 233a opposite to the surface of the suspension plate 233a where the piezoelectric element 233d is attached. Moreover, in embodiment(s) of the present disclosure, the protruding portion 233f may be integrally formed by a lithography process, and the protruding portion 233f is a protruding structure protruding from the surface of the suspension plate 233a opposite to the surface of the suspension plate 233a where the piezoelectric element 233d is attached.

In embodiment(s) of the present disclosure, a chamber space 237 is formed between the suspension plate 233a and the resonance sheet 232. The chamber space 237 can be formed by filling a material, such as conductive adhesive, between the resonance sheet 232 and the outer frame 233b of the piezoelectric actuator 233, but not limited thereto. Accordingly, by filling a material between the resonance sheet 230 and the suspension plate 233a, a certain distance can be maintained between the resonance sheet 232 and the suspension plate 233a, whereby the fluid can be guided to flow more quickly. Further, since an appropriate distance is maintained between the suspension plate 233a and the resonance sheet 232, the interference raised by the contact between the suspension plate 233a and the resonance sheet 232 can be reduced, so that the generation of noise can be decreased as well. In other embodiments, the needed thickness of the conductive adhesive between the resonance sheet 232 and the outer frame 233b of the piezoelectric actuator 233 can be decreased by increasing the height of the outer frame 233b of the piezoelectric actuator 233. Accordingly, during the assembling process of the micro pump 23, the situation that the actual spacing of the chamber space 237 being affected by the thermal expansion and contraction of the filling material can be avoided, thereby decreasing the indirect effect of the hot pressing temperature and the cooling temperature of the filling material on the entire structure of the micro pump 23, but this invention is not limited thereto. Moreover, the size of the chamber space 237 also affects the transmission efficiency of the micro pump 23. Therefore, it is important that a fixed size of the chamber space 237 should be maintained for the purpose of achieving stable transmission efficiency with the micro pump 23. Therefore, as shown in FIG. 3B, in another embodiment, the suspension plate 233a can be extended upwardly by a certain distance by a stamping process. The upward extension distance can be adjusted by at least one supporting element 233c between the suspension plate 233a and the outer frame 233b so as to make the surface of the protruding portion 233f on the suspension plate 233a be not coplanar with the surface of the outer frame 233b; that is, the surface of the protruding portion 233f is higher than the surface of the outer frame 233b. A few amount of filling material (such as the conductive adhesive) is applied on the assembly surface of the outer frame 233b, and the piezoelectric actuator 233 is assembled to the resonance sheet 232 by attaching the piezoelectric actuator 233 onto the fixed portion 232c of the resonance sheet 232 through hot pressing. By stamping the suspension plate 233a of the piezoelectric actuator 233 to form the chamber space 237, the chamber space 237 can be obtained through directly adjusting the extension distance of the suspension plate 233a of the piezoelectric actuator 233, which effectively simplifies the structural design of the chamber space 237, and also simplifies the manufacturing process and shortens the manufacturing time of the chamber space 237. Moreover, the first insulation plate 234, the conductive plate 235, and the second insulation plate 236 are all thin sheets with a frame like structure, and the first insulation plate 234, the conductive plate 235, and the second insulation plate 236 are sequentially stacked and assembled on the piezoelectric actuator 233 to form the complete structure of the micro pump 23.

Figure 3A:
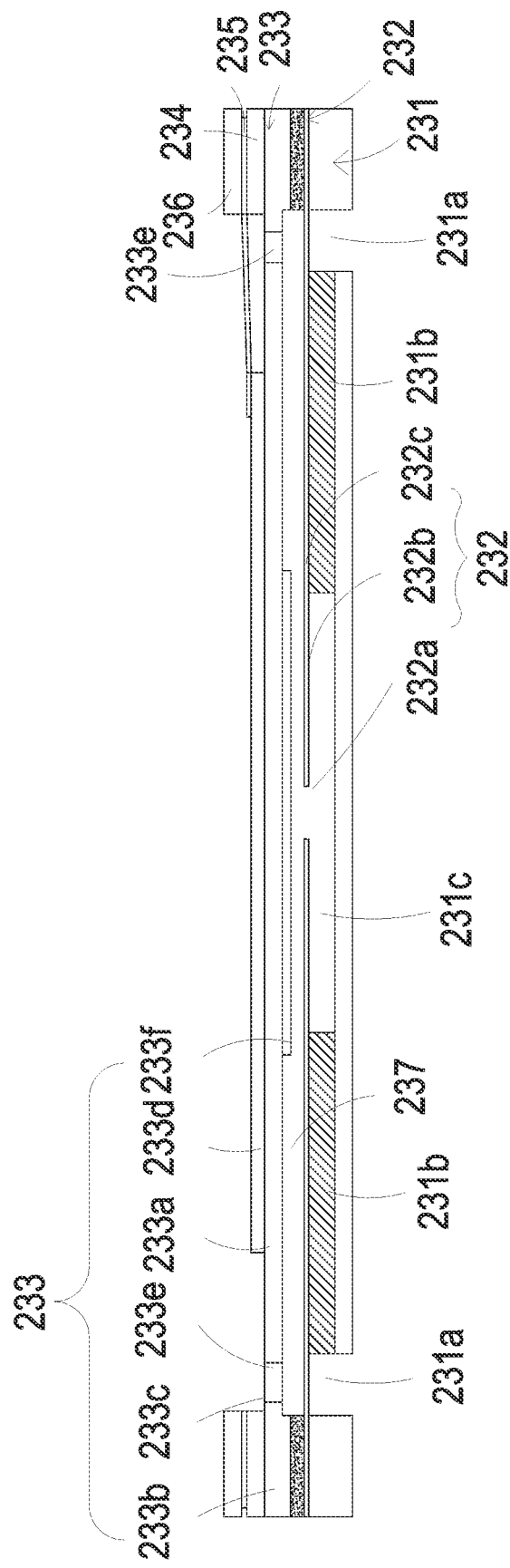
FIG. 3A illustrates a cross-sectional view of a micro pump having noise-reduced pressure-releasing structure according to a first embodiment of the present disclosure.
Figure 3B:
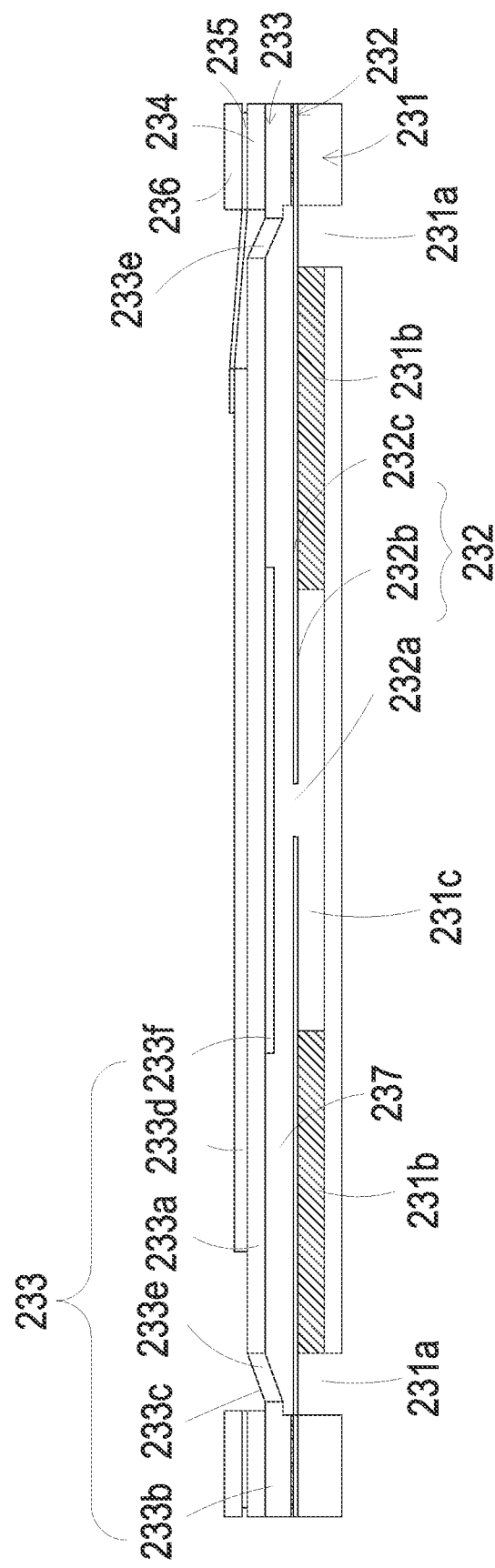
FIG. 3B illustrates a cross-sectional view of a micro pump having noise-reduced pressure-releasing structure according to a second embodiment of the present disclosure.

It is understood that, as shown in FIG. 3A, in embodiment (s) of the present disclosure, the inlet plate 231, the resonance sheet 232, the piezoelectric actuator 233, the first insulation plate 234, the conductive plate 235, and the second insulation plate 236 may be manufactured by the micro-electromechanical systems (MEMS) surface micromachining processes to reduce the size of the micro pump 23 so as to form a MEMS micro pump 23.

Figure 3C:
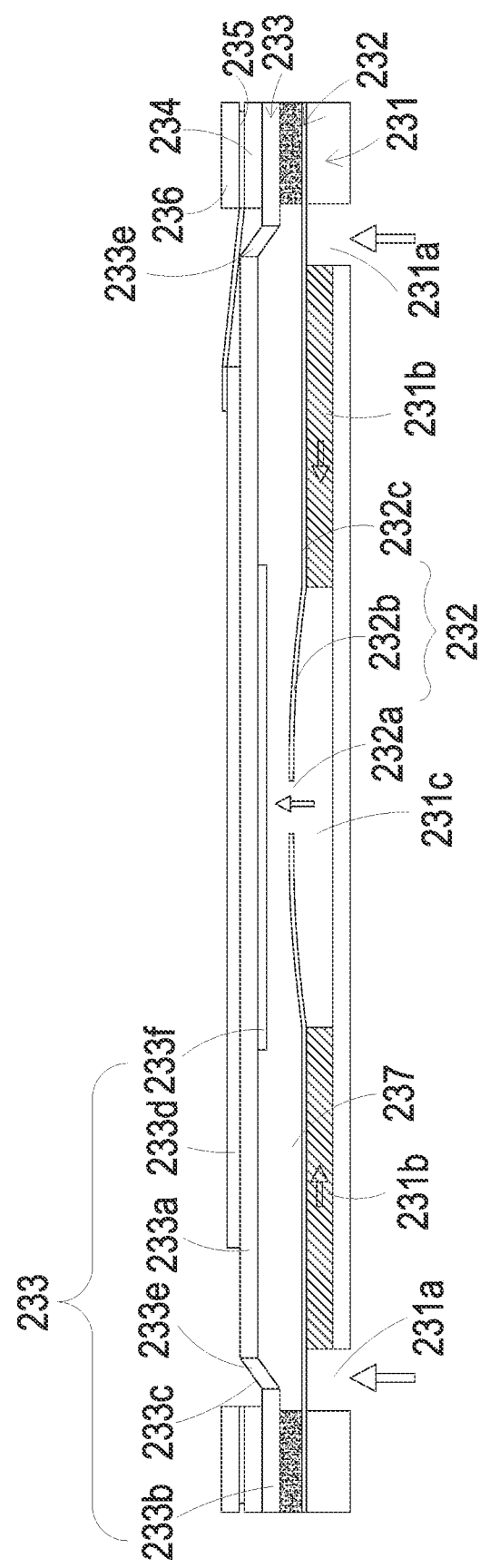
FIG. 3C to FIG. 3E illustrate schematic cross-sectional views showing the micro pump having noise-reduced pressure-releasing structure of the exemplary embodiment in different operation steps.
Figure 3D:
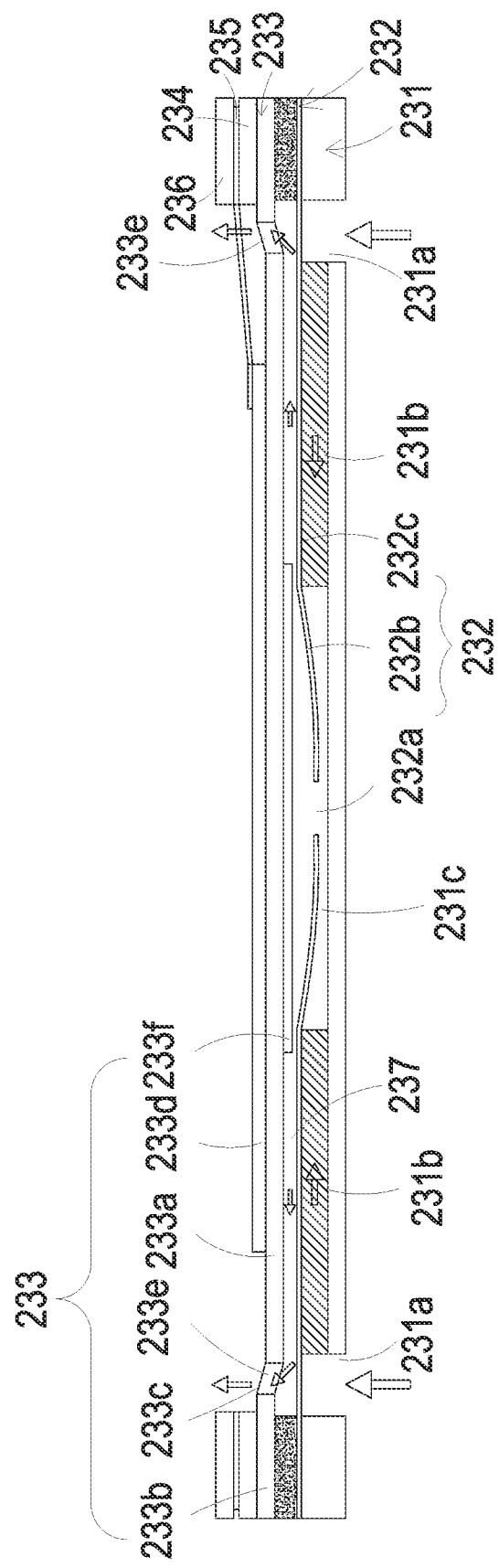
Figure 3E:
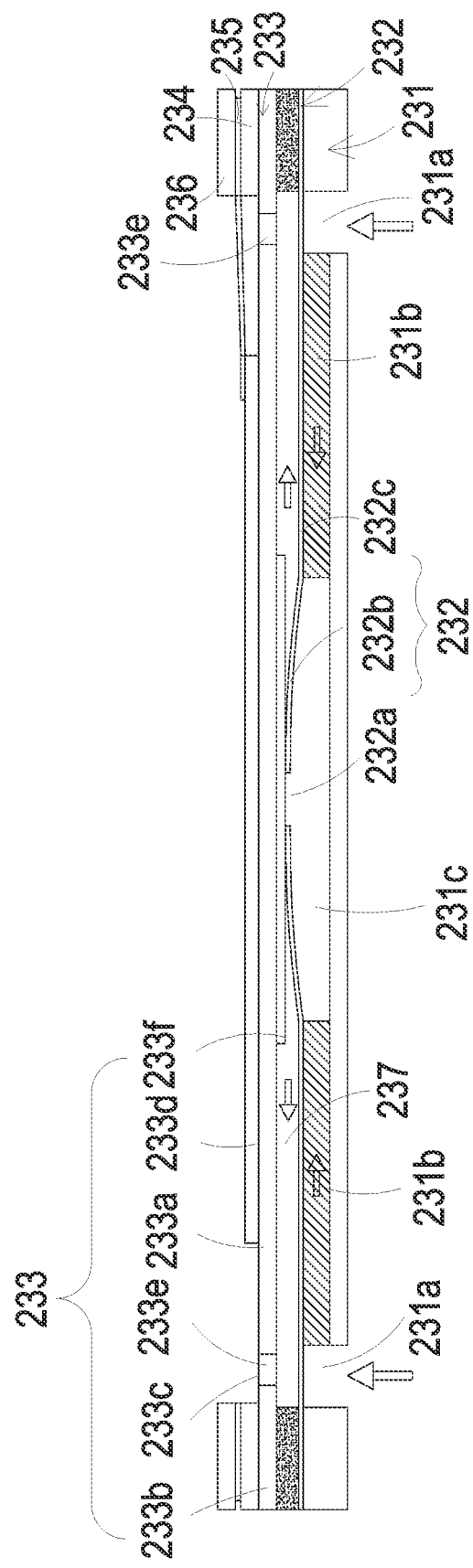

In order to understand the operation steps of the aforementioned micro pump 23, please refer to FIG. 3C to FIG. 3E. In embodiment(s) of the present disclosure, as shown in FIG. 3C firstly, the piezoelectric element 233d of the piezoelectric actuator 233 deforms after being applied with a driving voltage, and the piezoelectric element 233d drives the suspension plate 233a to move away from the inlet plate 231. Thus, the volume of the chamber space 237 is increased and a negative pressure is generated inside the chamber space 237, thereby drawing the fluid in the convergence chamber 231c into the chamber space 237. At the same time, owing to the resonance effect, the resonance sheet 232 moves away from the inlet plate 231 correspondingly, which also increases the volume of the convergence chamber 231c. Furthermore, since the fluid inside the convergence chamber 231c is drawn into the chamber space 237, the convergence chamber 231c is in a negative pressure state as well. Therefore, the fluid can be drawn into the convergence chamber 231c through the inlet hole 231a and the convergence channel 231b. Then, please refer to FIG. 3D. The piezoelectric element 233d drives the suspension plate 233a to move toward the inlet plate 231, thereby compressing the chamber space 237. Similarly, since the resonance sheet 232 resonates with the suspension plate 233a, the resonance sheet 232 also moves toward the inlet plate 231, thereby pushing the fluid in the chamber space 237 to be transmitted out of the micro pump 23 through the gap 233e so as to achieve fluid transmission. Last, please refer to FIG. 3E. When the suspension plate 233a moves resiliently to its original position in a direction away from the inlet plate 231, the resonance sheet 232 also moves away from the inlet plate 230. At the time, the resonance sheet 232 compresses the chamber space 237, so that the fluid in the chamber space 237 is moved toward the gap 233e and the volume of the convergence chamber 231c is increased. Accordingly, the fluid can be drawn into the convergence chamber 231c continuously through the inlet hole 231a and the convergence channel 231b and can be converged at the convergence chamber 231c. By continuously repeating the operation steps of the micro pump 23 shown in FIG. 3C to FIG. 3E, the micro pump 23 can make the fluid continuously enter into the flow paths formed by the inlet plate 231 and the resonance sheet 232 from the inlet hole 231a, thereby generating a pressure gradient. The fluid is then transmitted outward through the gap 233e. As a result, the fluid can flow at a relatively high speed, thereby achieving the effect of fluid transmission of the micro pump 23.

Figure 4A:
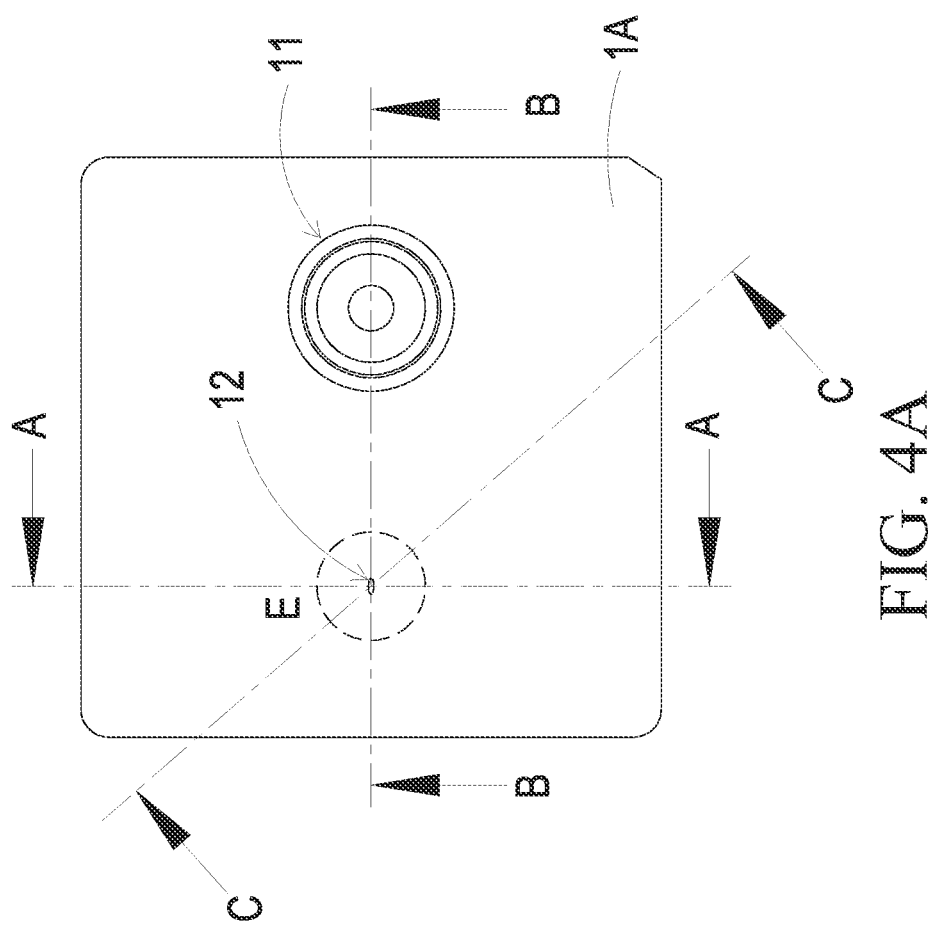
FIG. 4A illustrates a front top view of the convergence plate of the micro pump having noise-reduced pressure-releasing structure of the exemplary embodiment.
Figure 4B:
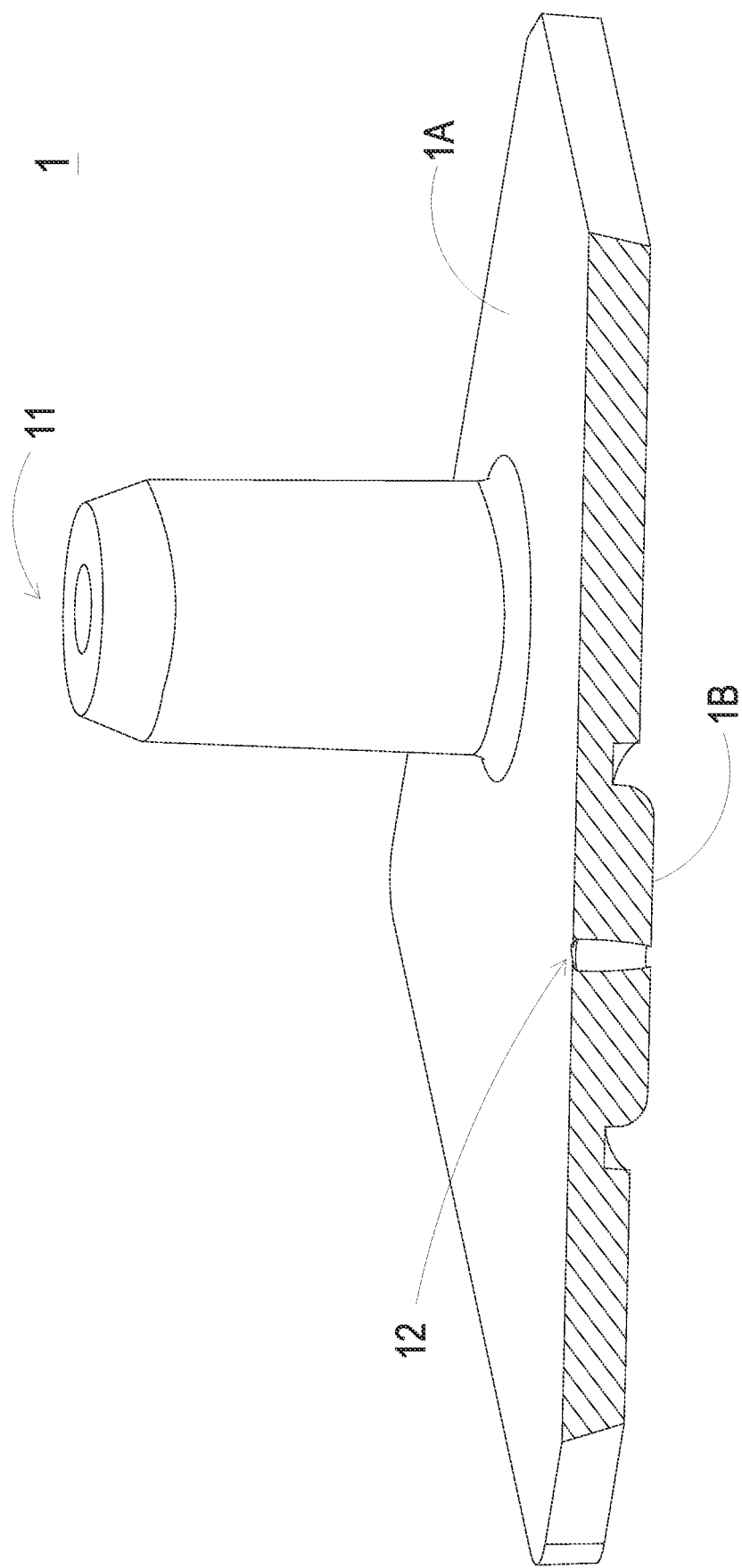
FIG. 4B illustrates a cross-sectional view along line C-C shown in FIG. 4A.
Figure 4C:
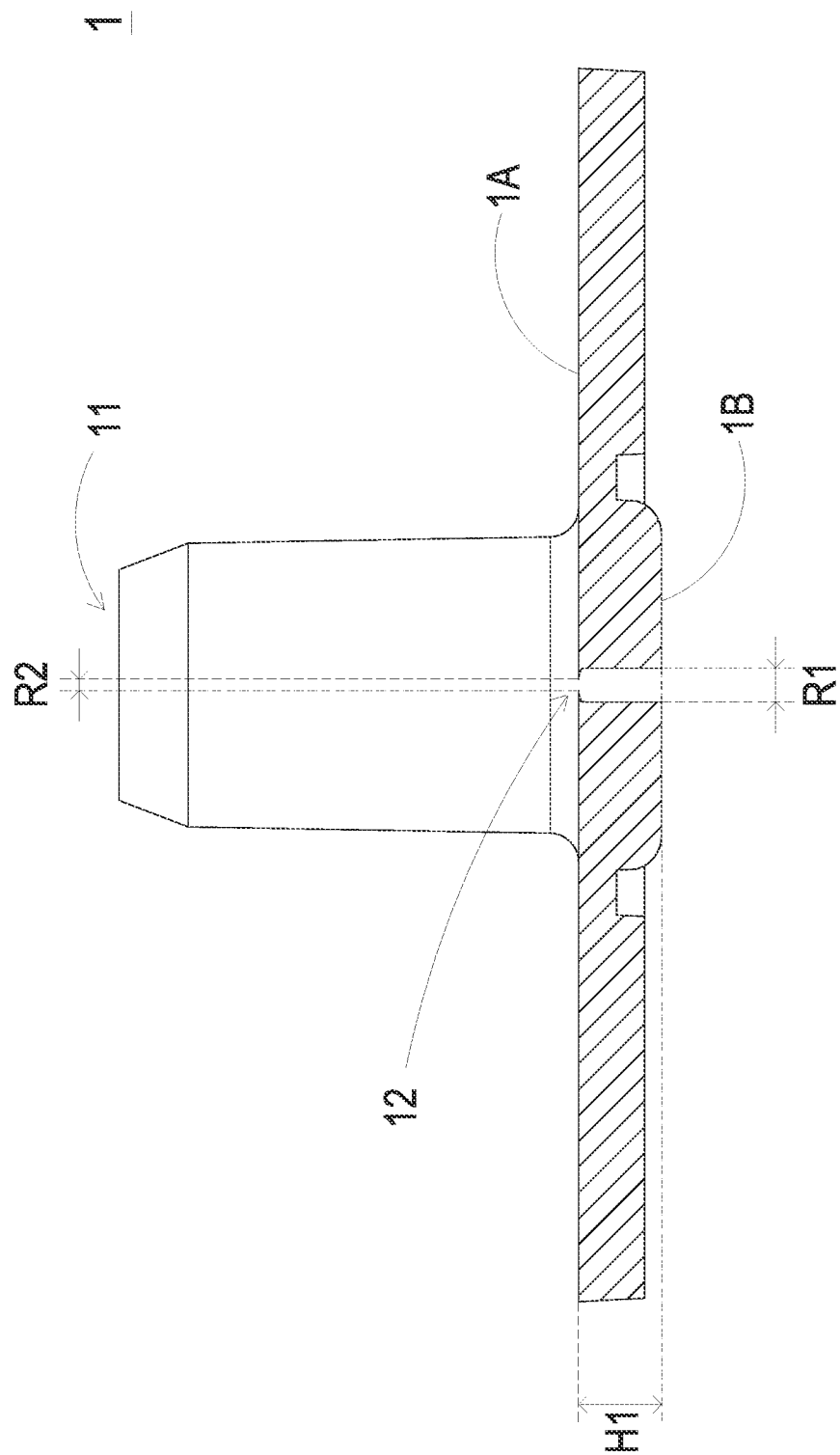
FIG. 4C illustrates a cross-sectional view along line A-A shown in FIG. 4A.

Please refer to FIG. 4A to FIG. 4C and FIGS. 4I to 4L, in embodiment(s) of the present disclosure, the discharge outlet 12 of the convergence plate 1 has a first diameter R1, a second diameter R2, and a first height H1. FIG. 4A illustrates a schematic view showing the convergence plate first surface 1A of the convergence plate 1 of the micro pump device 100 of the exemplary embodiment of the present disclosure. In FIG. 4A, the discharge outlet 12 at the convergence plate first surface 1A is elliptical shape, and the discharge outlet 12 at the convergence plate second surface 1B is circular shape (as shown in FIG. 2). Namely, in this embodiment, the shape of the discharge outlet 12 at the convergence plate first surface 1A is different from the shape of the discharge outlet 12 at the convergence plate second surface 1B. FIG. 4B illustrates a cross-sectional view along line C-C shown in FIG. 4A. It is understood that, though the shape of the discharge outlet 12 at the convergence plate first surface 1A is different from the shape of the discharge outlet 12 at the convergence plate second surface 1B, the shape of the discharge outlet 12 at the convergence plate second surface 1B is the same as the shape of a cross-section of the inner flow path of the discharge outlet 12. FIG. 4C illustrates a cross-sectional view along line A-A shown in FIG. 4A. As shown in FIG. 4C, the discharge outlet 12 has a first diameter R1, a second diameter R2, and a first height H1. Regarding the diameters of the discharge outlet 12, the second diameter R2 of the discharge outlet 12 at the convergence plate first surface 1A is different from the first diameter R1 of the discharge outlet 12 at the convergence plate second surface 1B, and the first height H1 of the flow path of the discharge outlet 12 is less than 1 mm, but this invention is not limited thereto; the value of the first height H1 may be varied according to design requirements.

Figure 4D:
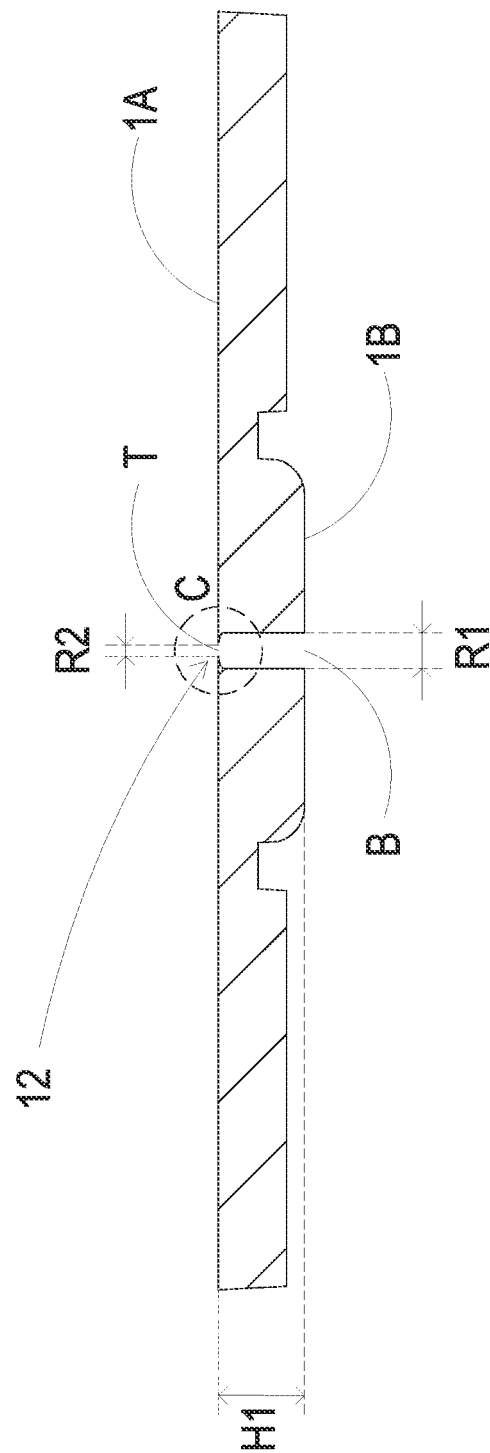
FIG. 4D illustrates a cross-sectional view of a first embodiment of the discharge outlet along line A-A shown in FIG. 4A.

Please refer to FIG. 4D. In the first embodiment of the present disclosure, the first diameter R1 of the discharge outlet 12 at the convergence plate second surface 1B is in a range between 0.2 mm and 0.3 mm. It is understood that, in other embodiments of the present disclosure, the first diameter R1 is in a range between 0.1 mm and 2 mm, but this invention is not limited thereto; the value of the first diameter R1 may be varied according to design requirements. Moreover, the second diameter R2 of the discharge outlet 12 at the convergence plate first surface 1A is in a range between 0.1 mm and 0.2 mm. It is understood that, as shown in FIG. 4I, in the first embodiment of the present disclosure, the value of the second diameter R2 may be varied according to design requirements; however, the value of the second diameter R2 should be less than or equal to the value of the first diameter R1, namely, the second diameter R2≤the first diameter R1. Even more, in other embodiments of the present disclosure, the value of the second diameter R2 should be less than the value of the first diameter R1, namely, the second diameter R2<the first diameter R1. FIG. 4J illustrates a cross-sectional view along line B-B shown in FIG. 4A. FIG. 4K illustrates an enlarged partial view of the discharge outlet 12 in the D portion shown in FIG. 4J. It is understood that, as shown by the cross-sectional view of the convergence plate 1 from another perspective (as indicated by sectioning the convergence plate 1 from sectioning line B-B), the inner flow path of the discharge outlet 12 has a first height H1, and the inner flow path of the discharge outlet 12 extends from the first diameter R1 at the convergence plate second surface 1B (i.e., the bottom B) to the convergence plate first surface 1A (i.e., the top T) of the discharge outlet 12. Namely, in this embodiment, from sectioning line B-B, the hole size of the inner flow path in the first height H1 of the discharge outlet 12 is the same from the bottom B to the top T. FIG. 4L illustrates an enlarged partial view of the discharge outlet 12 in the E portion shown in FIG. 4A. It is understood that, the first diameter R1 of the discharge outlet 12 at the convergence plate first surface 1A is greater than the second diameter R2, that is, the first diameter R1>the second diameter R2. It should be noted that, in other embodiments of the present disclosure, the value of the first diameter R1 and the value of the second diameter R2 may be varied according to design requirements; however, the value of the first diameter R1 should be greater than or equal to the value of the second diameter R2, namely, the first diameter R1≥the second diameter R2.

Figure 4E:
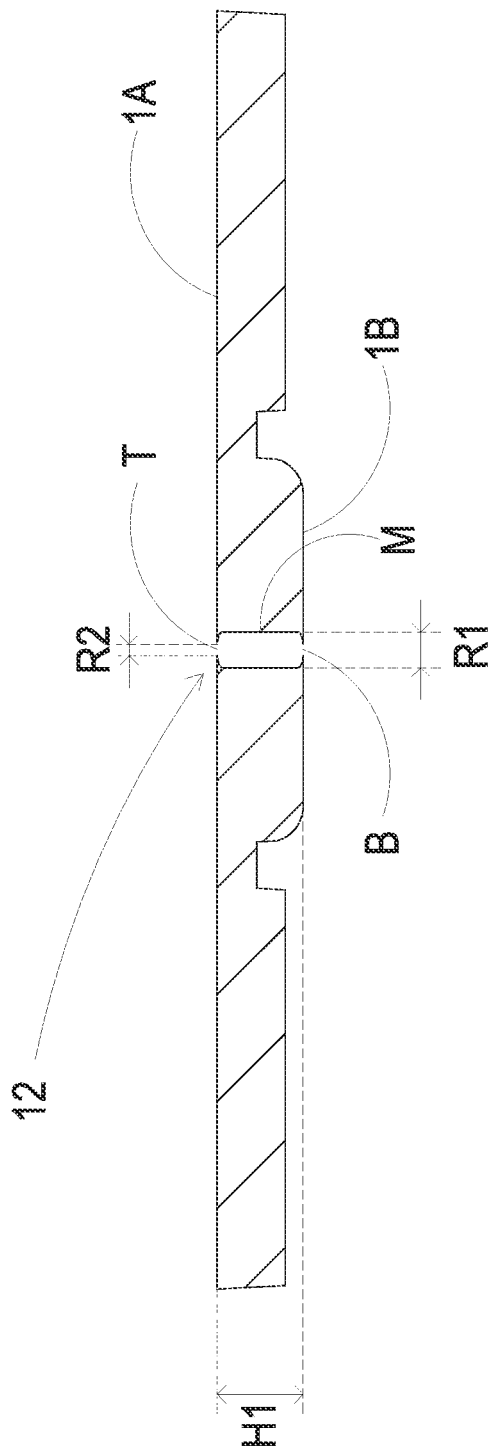
FIG. 4E illustrates a cross-sectional view of a second embodiment of the discharge outlet along line A-A shown in FIG. 4A.

Next, please refer to FIG. 4E. In the second embodiment of the present disclosure, the discharge outlet 12 has a second diameter R2 respectively at the convergence plate first surface 1A and at the convergence plate second surface 1B, and the second diameters R2 respectively configured at the top T and the bottom B of the inner flow path of the discharge outlet 12. The middle section M of the inner flow path of the discharge outlet 12 has a first diameter R1. The value of the first diameter R1 and the value of the second diameter R2 may be varied according to design requirements; however, the value of the first diameter R1 should be greater than the value of the second diameter R2, namely, the first diameter R1>the second diameter R2.

Figure 4F:
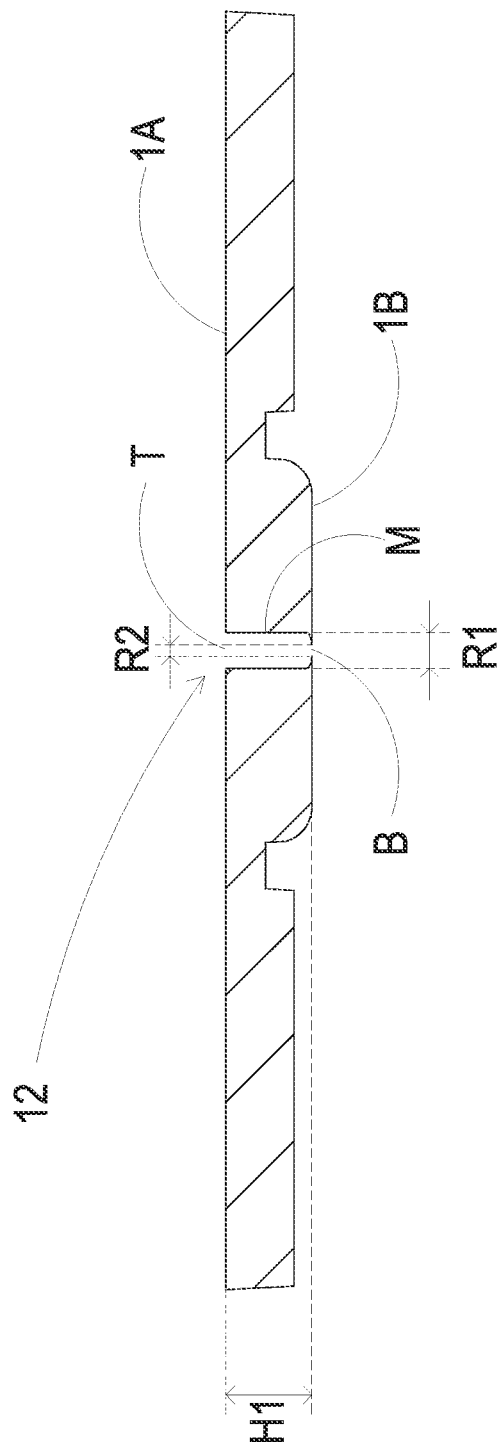
FIG. 4F illustrates a cross-sectional view of a third embodiment of the discharge outlet along line A-A shown in FIG. 4A.

Next, please refer to FIG. 4F. In the third embodiment of the present disclosure, the bottom B of the inner flow path of the discharge outlet 12 has a second diameter R2 at the convergence plate second surface 1B, the discharge outlet 12 has a first diameter R1 at the convergence plate first surface 1A, and a hole size of the middle section M of the inner flow path of the discharge outlet 12 is the same as the value of the first diameter R1. The value of the first diameter R1 and the value of the second diameter R2 may be varied according to design requirements; however, the value of the first diameter R1 should be greater than the value of the second diameter R2, namely, the first diameter R1>the second diameter R2. Moreover, it should be noted that, the position of the second diameter R2 may be adjusted according to design requirements. That is, the second diameter R2 may be configured at the top T or the bottom B of the inner flow path of the discharge outlet 12, or may be configured at the middle section M of the inner flow path of the discharge outlet 12, or may be configured at a portion near the middle section M of the inner flow path of the discharge outlet 12. The discharge outlet 12 has at least one second diameter R2, and the at least one second diameter R2 is in a range between 0.1 mm and 0.2 mm. A cross-sectional area of the discharge outlet 12 at the convergence plate first surface 1A is different from a cross-sectional area of the discharge outlet 12 at the convergence plate second surface 1B.

Figure 4G:
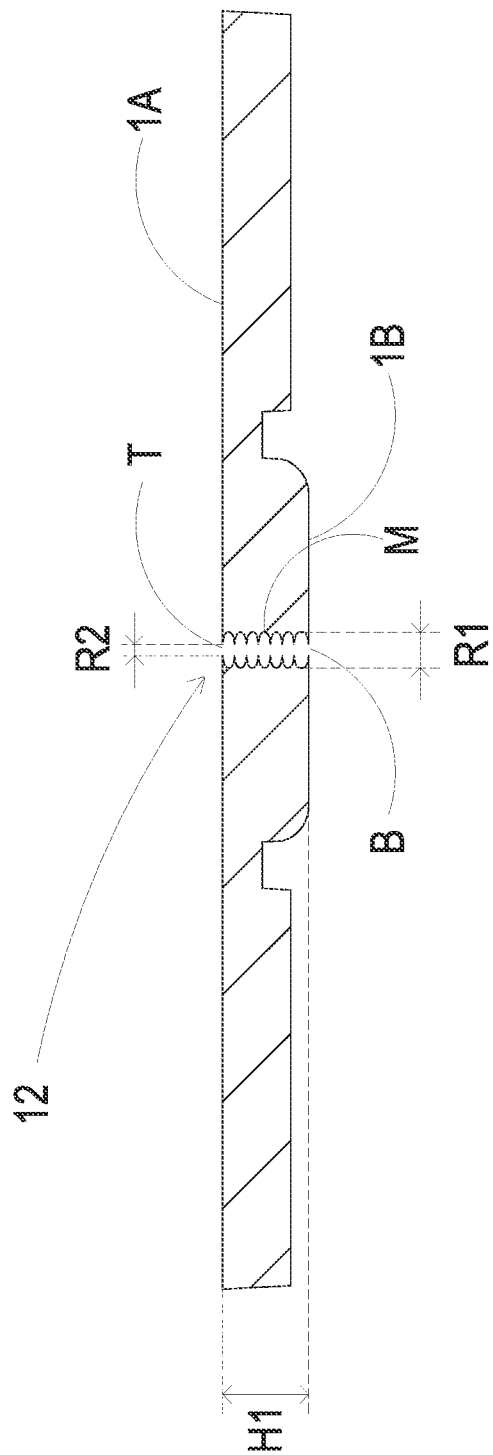
FIG. 4G illustrates a cross-sectional view of a fourth embodiment of the discharge outlet along line A-A shown in FIG. 4A.

Next, please refer to FIG. 4G In the fourth embodiment of the present disclosure, the convergence plate first surface 1A and the convergence plate second surface 1B of the discharge outlet 12 each has a second diameter R2 respectively, and these second diameters R2 are configured at the top T and the bottom B of the inner flow path of the discharge outlet 12 respectively. Moreover, the hole size of the middle section M of the inner flow path of the discharge outlet 12 has a plurality of first diameters R1 and a plurality of second diameters R2 intersected with each other. It is understood that, regarding the intersected first diameters R1 and second diameters R2, the number of the first diameters R1, the number of the second diameters R2, the arrangement density of the first diameters R1, and the arrangement density of the second diameters R2 may be varied according to design requirements; the value of the second diameter R2 may also be varied according to design requirements; however, the value of the first diameter R1 should be greater than the value of the second diameter R2, namely, the first diameter R1>the second diameter R2. Moreover, the inner flow path of the discharge outlet 12 has a plurality of second diameters R2, and the second diameters R2 are in a range between 0.1 mm and 0.2 mm.

Figure 4H:
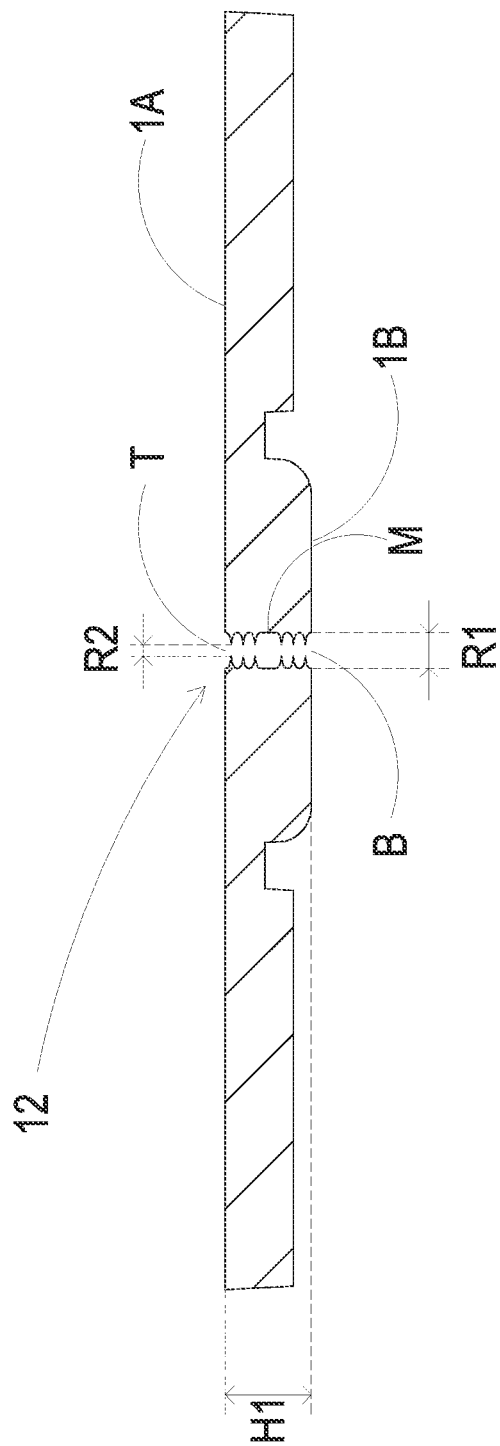
FIG. 4H illustrates a cross-sectional view of a fifth embodiment of the discharge outlet along line A-A shown in FIG. 4A.
Figure 4I:
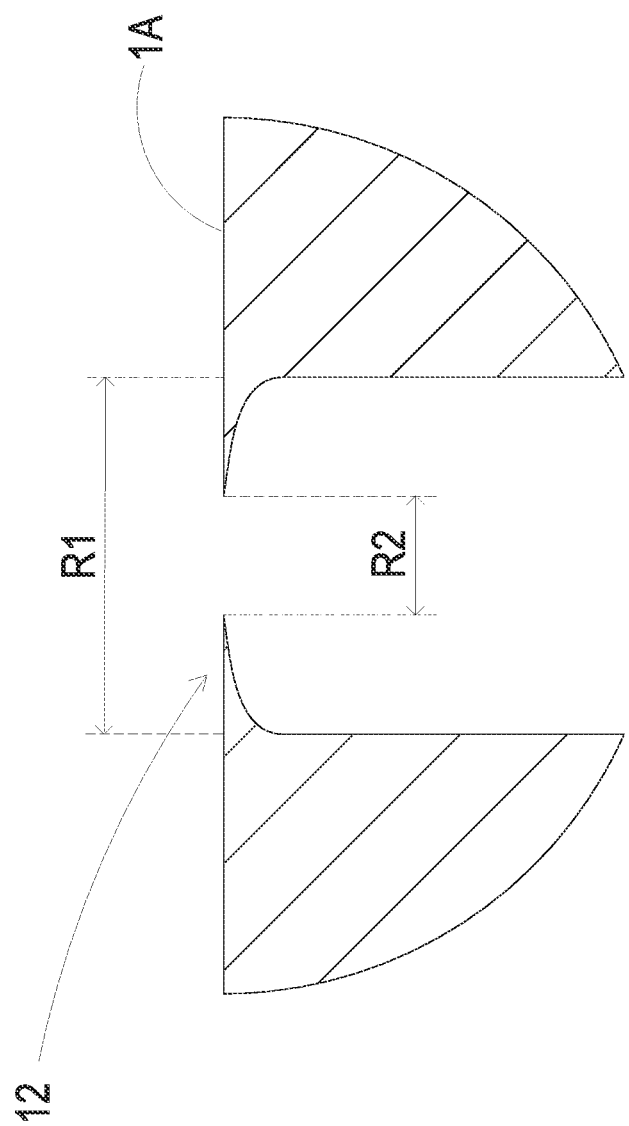
FIG. 4I illustrates an enlarged partial view of the discharge outlet in the C portion shown in FIG. 4D.
Figure 4J:
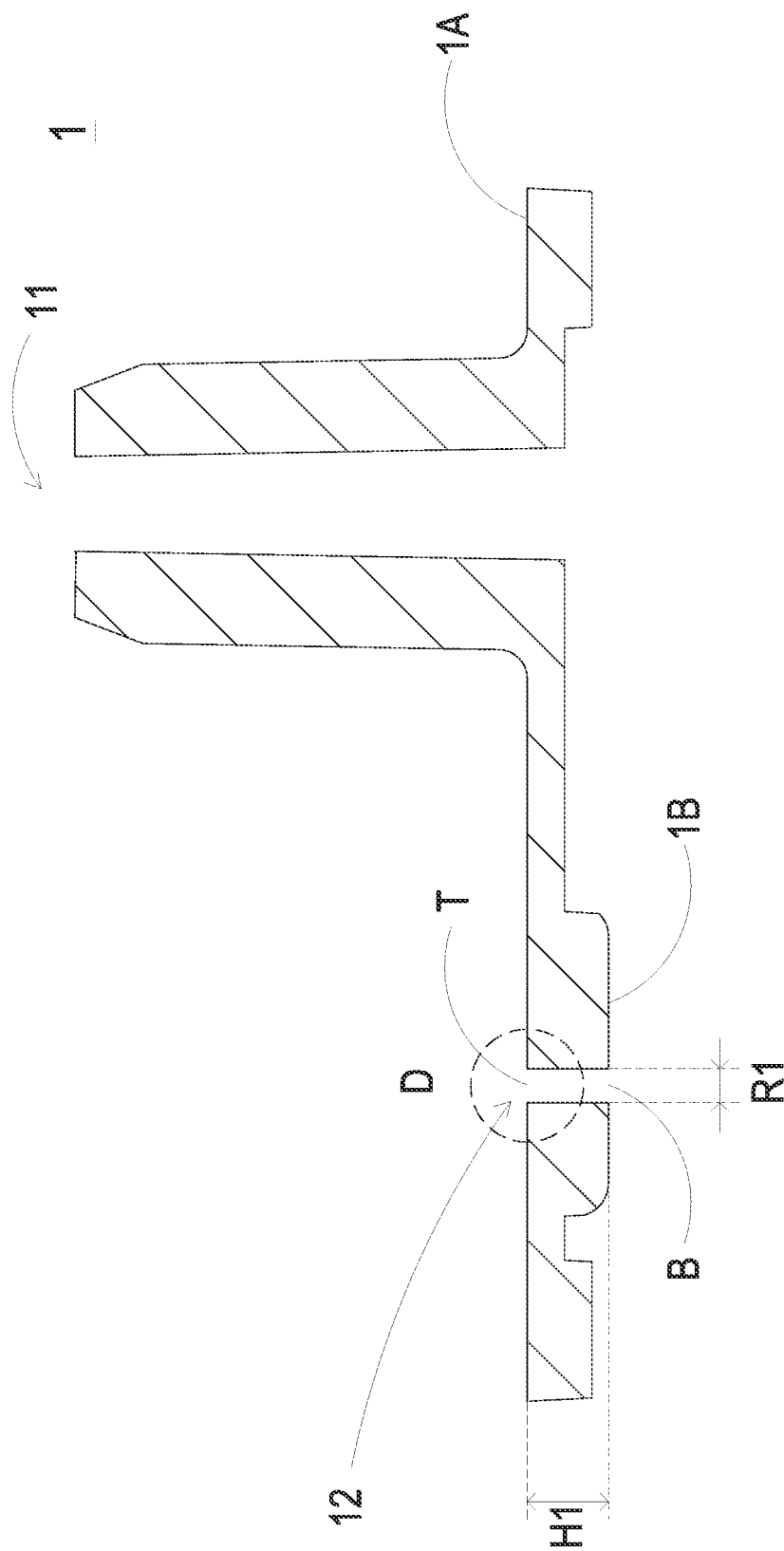
FIG. 4J illustrates a cross-sectional view along line B-B shown in FIG. 4A.
Figure 4L:
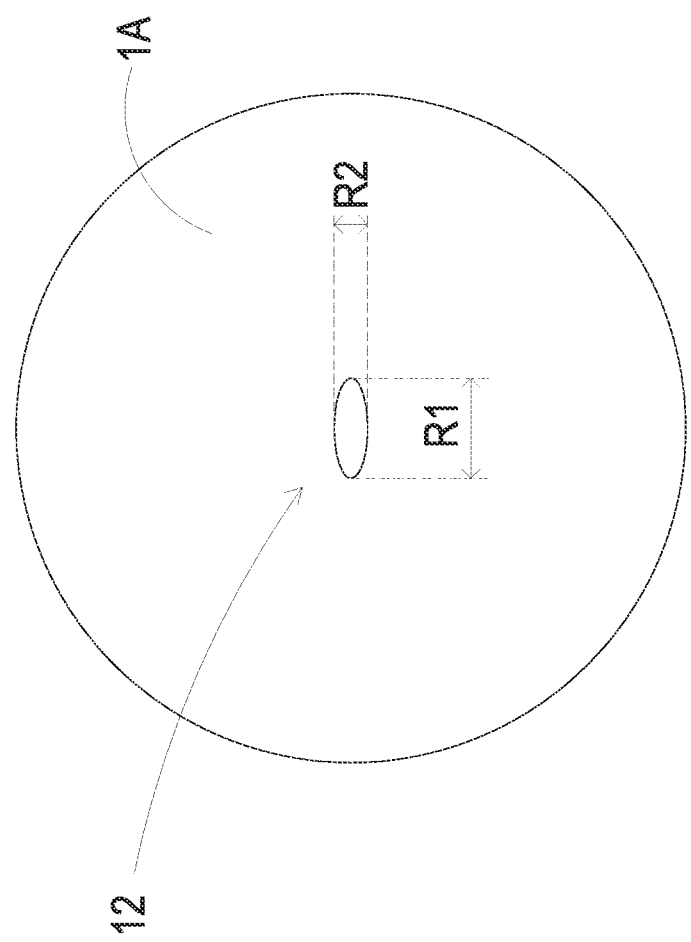
FIG. 4L illustrates an enlarged partial view of the discharge outlet in the E portion shown in FIG. 4A.

Next, please refer to FIG. 4H. In the fifth embodiment of the present disclosure, the discharge outlet 12 does not have a second diameter R2 at the convergence plate first surface 1A and the convergence plate second surface 1B respectively; instead, the discharge outlet 12 has a first diameter R1, and the first diameters R1 respectively configured at the top T, the middle section M, and the bottom B of the inner flow path of the discharge outlet 12. Moreover, the hole size of the middle section M of the inner flow path of the discharge outlet 12 has a plurality of first diameters R1 and a plurality of second diameters R2 intersected with each other. It is understood that, regarding the intersected first diameters R1 and second diameters R2, the number of the first diameters R1, the number of the second diameters R2, the arrangement density of the first diameters R1, and the arrangement density of the second diameters R2 may be varied according to design requirements. Moreover, a section of the middle section M of the inner flow path of the discharge outlet 12 only has the first diameter R1 and does not have the second diameter R2. The value of the first diameter R1 and the value of the second diameter R2 may be varied according to design requirements; however, the value of the first diameter R1 should be greater than the value of the second diameter R2, namely, the first diameter R1>the second diameter R2. Moreover, the inner flow path of the discharge outlet 12 has a plurality of second diameters R2, and the second diameters R2 are in a range between 0.1 mm and 0.2 mm.

Figure 5A:
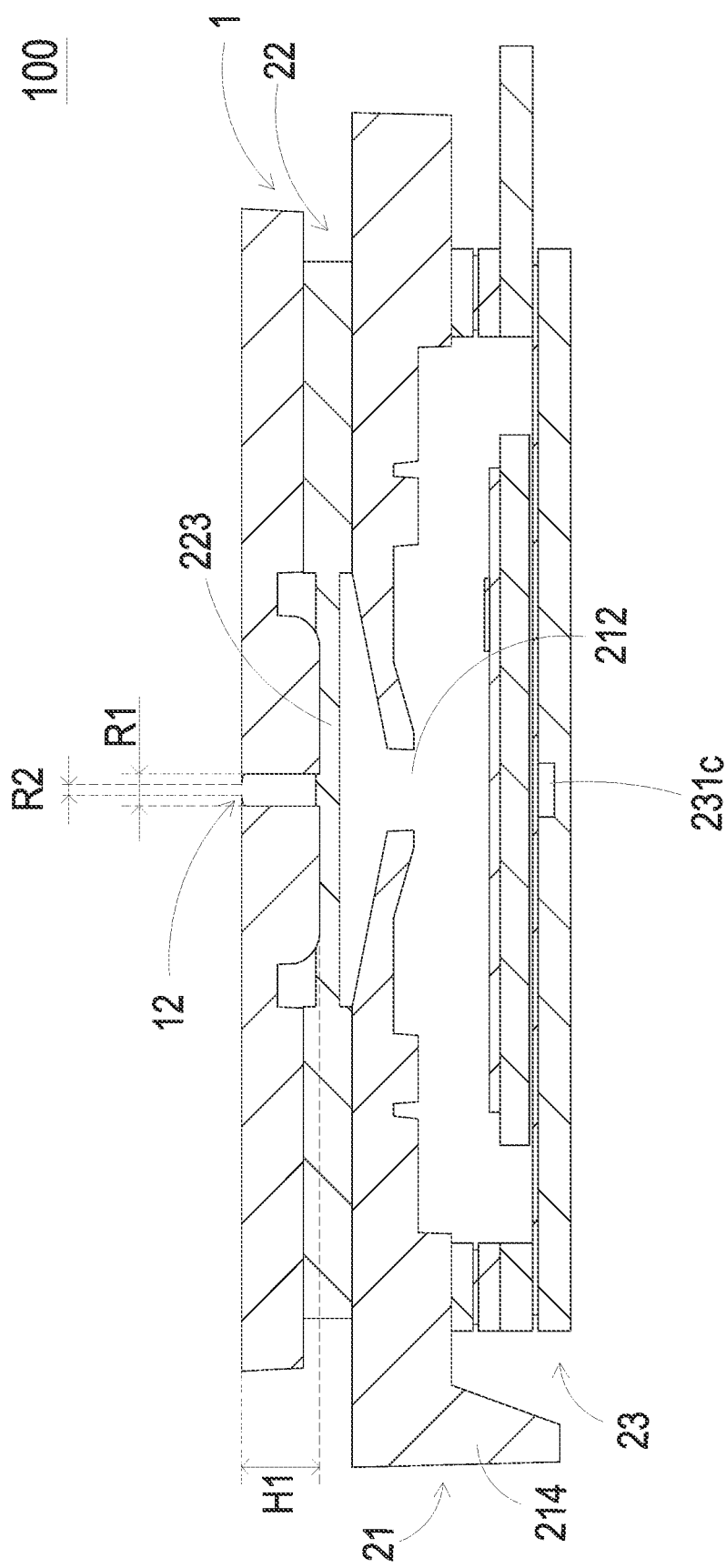
FIG. 5A illustrates a schematic static cross-sectional view showing that the discharge outlet of the micro pump having noise-reduced pressure-releasing structure of the exemplary embodiment is not in the pressure-releasing procedure.

Please refer to FIG. 5A. FIG. 5A illustrates a schematic static cross-sectional view showing that the discharge outlet 12 of the micro pump device 100 of the exemplary embodiment which is not in the pressure-releasing procedure, and FIG. 5A is the schematic cross-sectional view, along line A-A shown in FIG. 4A, of the micro pump device 100 and further including the convergence plate 1, the valve sheet 22, the chamber plate 21, and the micro pump 23. Please refer to FIG. 1, FIG. 2, and FIG. 5A, as shown, when the micro pump 23 is in operation, since the receiving trough 214 of the chamber plate 21 encloses and seals the entire micro pump 23, the fluid transmission direction is from the micro pump 23 toward the chamber plate 21. After parts of the fluid flow through the fluid determine hole 212 of the chamber plate 21, the discharge recessed portion 223 of the valve sheet 22 above the fluid determine hole 212 blocks the discharge outlet 12 of the convergence plate 1 owing to the pressure of the fluid. Hence, the fluid can only flow through the fluid through hole 213 of the chamber plate 21. Accordingly, the fluid flows through the valve hole 221 of the valve sheet 22 and the flows out from the convergence outlet 11 of the convergence plate 1, thereby achieving transmission of the fluid.

Figure 5B:
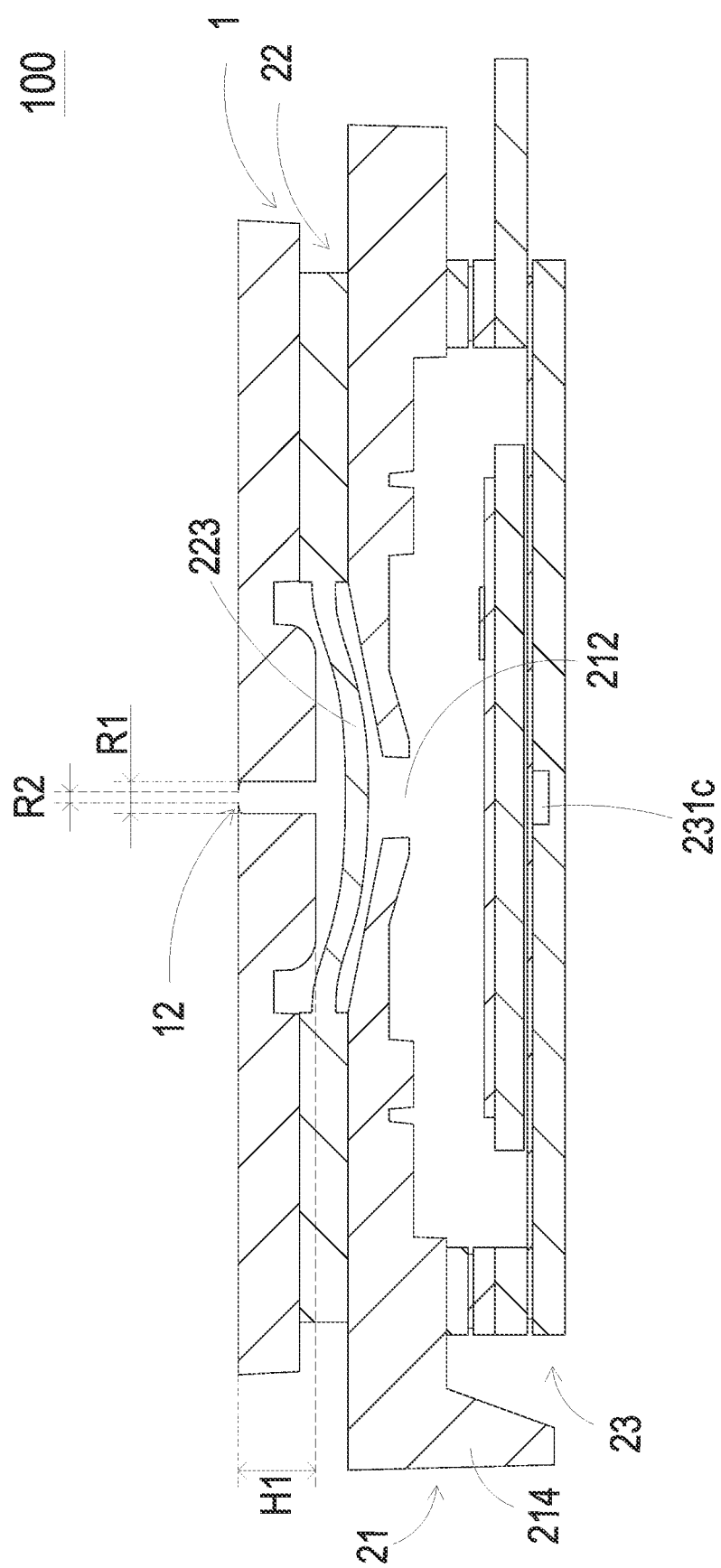
FIG. 5B illustrates a schematic static cross-sectional view showing that the discharge outlet of the micro pump having noise-reduced pressure-releasing structure of the exemplary embodiment is in the pressure-releasing procedure.

Please refer to FIG. 5B. FIG. 5B illustrates a schematic static cross-sectional view showing that the discharge outlet 12 of the micro pump device 100 of the exemplary embodiment is in the pressure-releasing procedure, and FIG. 5B is also the schematic cross-sectional view, along line A-A shown in FIG. 4A, of the micro pump device 100 further including the convergence plate 1, the valve sheet 22, the chamber plate 21, and the micro pump 23. Please refer to FIG. 1, FIG. 2, and FIG. 5B, as shown, when the micro pump 23 is not in operation, since some fluid is already accumulated at the convergence outlet 11 of the convergence plate 1, meanwhile the micro pump 23 does not operate, the fluid at the convergence outlet 11 of the convergence plate 1 flows back to the valve sheet 22 owing to the pressure of the fluid as the valve hole 221 of the valve sheet 22 is just blocked by the outer peripheral portion of the recessed hole 211 of the chamber plate 21. Consequently, the fluid does not flow back to the valve sheet 22; but flows to the discharge recessed portion 223 of the valve sheet 22 through the discharge channel 14 of the convergence plate 1, and the fluid determine hole 212 provides a deformation space for the discharge recessed portion 223. Moreover, follow to the law of nature that fluids flow from a higher pressure portion to a lower pressure portion, the fluid finally flows out from the discharge outlet 12 of the convergence plate 1, thereby completing the pressure-releasing procedure. It is understood that, the turbulence effect can be achieved through the structure design of the discharge outlet 12 according to different embodiments of the instant disclosure.

As above, in the micro pump having noise-reduced pressure-releasing structure 100 (the micro pump device 100) in one or some embodiments of the present disclosure, the discharge outlet 12 of the convergence plate 1 has the first diameter R1 and the second diameter R2. Hence, when the micro pump 23 stops operation, the fluid performs the pressure-releasing procedure. During the pressure-releasing procedure, the noise generated upon the fluid passes through the discharge outlet 12 could be reduced through the turbulence effect provided by the configuration of the discharge outlet 12. As a result, the micro pump device 100 can transmit a large amount of fluids and reduce unwanted noises during the pressure-releasing procedure. Moreover, the noise generated by the micro pump 23 driven with the piezoelectric actuator is very small during fluid transmission. Furthermore, since the valve sheet 22 is a movable thin sheet, the pressure difference allows the valve sheet to passively open or close the flowing path when it is cooperated with the configuration of the discharge outlet 12 of the convergence plate 1 so as to allow the fluid to flow in a single direction, accumulate pressure, and discharge out from the convergence plate 1. When the micro pump 23 is not in operation, the fluid can be controlled by the discharge channel 14 of the convergence plate 1 and the valve sheet 22 so as to be discharged out of the convergence plate 1 rapidly and accomplish the pressure-releasing procedure. Hence, the micro pump device 100 of one or some embodiments of the present invention can achieve the benefits of miniaturizing in size, reducing noise, and transmitting a large amount of fluids.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A micro pump having noise-reduced pressure-releasing structure, comprising:
    a convergence plate having a convergence plate first surface, a convergence plate second surface, a convergence outlet, and a discharge outlet, wherein the convergence plate second surface and the convergence plate first surface are opposite surfaces, wherein the convergence outlet and the discharge outlet both penetrate the convergence plate from the convergence plate first surface to the convergence plate second surface, wherein the convergence plate second surface further comprises at least one mortise and a discharge channel, and wherein the at least one mortise is symmetrically disposed on the convergence plate second surface, the discharge channel is in communication with the convergence outlet, and the discharge channel is in communication with the discharge outlet;
    a valve sheet having a first contact surface and a second contact surface, wherein the first contact surface and the convergence plate second surface of the convergence plate form a connection surface, wherein the second contact surface and the first contact surface are opposite to each other, and wherein the first contact surface comprises a valve hole, at least one tenon through hole, and a discharge recessed portion, the valve hole and the at least one tenon through hole both penetrate the valve sheet from the first contact surface to the second contact surface, and the at least one tenon through hole and the at least one mortise are disposed correspondingly;
    a chamber plate having a chamber plate first surface and a chamber plate second surface, wherein the chamber plate first surface and the second contact surface of the valve sheet form another connection surface, wherein the chamber plate second surface and the chamber plate first surface are opposite to each other, wherein the chamber plate first surface comprises a recessed hole, a fluid determine hole, at least one fluid through hole and at least one tenon, wherein the recessed hole does not penetrate the chamber plate from the chamber plate first surface to the chamber plate second surface, wherein the fluid determine hole and the at least one fluid through hole both penetrate the chamber plate from the chamber plate first surface to the chamber plate second surface, and wherein the at least one tenon, the at least one mortise of the convergence plate, and the at least one tenon through hole of the valve sheet are disposed correspondingly, and the chamber plate second surface has a receiving trough; and
    a micro pump core, wherein the micro pump core is positioned in the receiving trough of the chamber plate so as to transmit a fluid to the convergence outlet of the convergence plate through the at least one fluid though hole of the chamber plate and the valve hole of the valve sheet;
    wherein during operation of the micro pump core, the fluid is firstly transmitted to the at least one fluid through hole and the fluid determine hole of the chamber plate to push the valve sheet, meanwhile the fluid from the fluid determine hole of the chamber plate pushes the discharge recessed portion of the valve sheet above the fluid determine hole to block the discharge outlet of the convergence plate; then, since the pressure of the fluid at the at least one fluid through hole of the chamber plate pushes the valve sheet above the recessed hole of the chamber plate, the fluid is capable of flowing through the valve hole of the valve sheet so as to be discharged out from the convergence outlet of the convergence plate.

2. The micro pump having noise-reduced pressure-releasing structure according to claim 1, wherein when the micro pump core is not in operation, the fluid is firstly flowed back below the convergence outlet of the convergence plate, and the pressure of the fluid pushes the valve sheet below the convergence outlet, and wherein since the valve hole is blocked by an outer peripheral portion of the recessed hole of the chamber plate, the fluid flows toward the discharge channel and downwardly pushes the discharge recessed portion of the valve sheet below the discharge outlet, so that the fluid flows out from the discharge outlet through the discharge channel, thereby completing a pressure-releasing procedure.

3. The micro pump having noise-reduced pressure-releasing structure according to claim 2, wherein the micro pump core comprises:
- an inlet plate having at least one inlet hole, at least one convergence channel, and a convergence chamber, wherein the at least one inlet hole is configured to guide the outside fluid to flow into the micro pump, the at least one inlet hole penetrates the inlet plate and is in communication with the at least one convergence channel, and the at least one convergence channel is in communication with the convergence chamber, so that the fluid guided from the at least one inlet hole is converged at the convergence chamber via the at least one convergence channel;
- a resonance sheet attached to the inlet plate, wherein the resonance sheet has a perforation, a movable portion, and a fixed portion, wherein the perforation is located at a center portion of the resonance sheet and corresponds to the convergence chamber of the inlet plate, the movable portion is disposed at a periphery of the perforation, and the fixed portion is disposed at an outer periphery of the resonance sheet and attached to the inlet plate; and
- a piezoelectric actuator attached to the resonance sheet;
- wherein a chamber space is formed between the resonance sheet and the piezoelectric actuator, so that when the piezoelectric actuator is driven, the piezoelectric actuator resonates with the movable portion of the resonance sheet, and the fluid outside the micro pump is guided into the micro pump through the at least one inlet hole of the inlet plate, converged at the convergence chamber via the at least one convergence channel, and flowed through the perforation of the resonance sheet, thereby achieving transmission of the fluid.

4. The micro pump having noise-reduced pressure-releasing structure according to claim 3, wherein the piezoelectric actuator comprises:
- a suspension plate having a square shape, wherein the suspension plate is capable of bending and vibrating;
- an outer frame disposed around a periphery of the suspension plate;
- at least one supporting element connected between the suspension plate and the outer frame to provide a flexible support for the suspension plate; and
- a piezoelectric element having a side length, wherein the side length of the piezoelectric element is smaller than or equal to a side length of the suspension plate, and the piezoelectric element is attached to a surface of the suspension plate so as to drive the suspension plate to bend and vibrate when a voltage is applied thereto.

5. The micro pump having noise-reduced pressure-releasing structure according to claim 4, wherein the suspension plate has a protruding portion disposed on a surface of the suspension plate opposite to the surface of the suspension plate where the piezoelectric element is attached.

6. The micro pump having noise-reduced pressure-releasing structure according to claim 4, wherein the suspension plate has a protruding portion integrally formed by a lithography process, and the protruding portion is a protruding structure protruding from a surface of the suspension plate opposite to the surface of the suspension plate where the piezoelectric element is attached.

7. The micro pump having noise-reduced pressure-releasing structure according to claim 3, wherein the micro pump core further comprises a first insulation sheet, a conductive sheet, and a second insulation sheet, and wherein the inlet plate, the resonance sheet, the piezoelectric actuator, the first insulation sheet, the conductive sheet, and the second insulation sheet are arranged sequentially and stacked with each other.

8. The micro pump having noise-reduced pressure-releasing structure according to claim 3, wherein the piezoelectric actuator comprises:
- a suspension plate having a square shape, wherein the suspension plate is capable of bending and vibrating;
- an outer frame disposed around a periphery of the suspension plate;
- at least one supporting element connected between the suspension plate and the outer frame to provide a flexible support for the suspension plate, wherein a surface of the suspension plate and a surface of the outer frame are not coplanar, and wherein the chamber space is formed between the surface of the suspension plate and the resonance sheet; and
- a piezoelectric element having a side length, wherein the side length of the piezoelectric element is smaller than or equal to a side length of the suspension plate, and the piezoelectric element is attached to the surface of the suspension plate so as to drive the suspension plate to bend and vibrate when a voltage is applied thereto.

9. The micro pump having noise-reduced pressure-releasing structure according to claim 1, wherein the micro pump core is a micro-electromechanical systems (MEMS) pump.

10. The micro pump having noise-reduced pressure-releasing structure according to claim 1, wherein the discharge outlet has a first diameter, and the first diameter is in a range between 0.1 mm and 2 mm.

11. The micro pump having noise-reduced pressure-releasing structure according to claim 10, wherein the first diameter of the discharge outlet is in a range between 0.2 mm and 0.3 mm.

12. The micro pump having noise-reduced pressure-releasing structure according to claim 1, wherein the discharge outlet has a second diameter, and the second diameter is in a range between 0.1 mm and 2 mm.

13. The micro pump having noise-reduced pressure-releasing structure according to claim 1, wherein the discharge outlet has at least one second diameter, and the at least one second diameter is in a range between 0.1 mm and 2 mm.

14. The micro pump having noise-reduced pressure-releasing structure according to claim 1, wherein the discharge outlet has a plurality of second diameters, and the second diameters are in a range between 0.1 mm and 2 mm.

15. The micro pump having noise-reduced pressure-releasing structure according to claim 1, wherein the discharge outlet has a first height, and the first height is less than 1 mm.

16. The micro pump having noise-reduced pressure-releasing structure according to claim 1, wherein a cross-sectional area of the discharge outlet at the convergence plate first surface is different from a cross-sectional area of the discharge outlet at the convergence plate second surface.

17. The micro pump having noise-reduced pressure-releasing structure according to claim 1, wherein a shape of the discharge outlet at the convergence plate first surface is different from a shape of the discharge outlet at the convergence plate second surface.

* * * * *